(12) United States Patent
Matsunaga et al.

(10) Patent No.: US 11,471,842 B2
(45) Date of Patent: Oct. 18, 2022

(54) LIQUID-MIXING APPARATUS AND LIQUID-MIXING METHOD

(71) Applicant: HONDA MOTOR CO., LTD., Tokyo (JP)

(72) Inventors: Hiroki Matsunaga, Tochigi-ken (JP); Masaki Shigekura, Tochigi-ken (JP); Masayuki Yamaguchi, Tochigi-ken (JP); Takashi Wakimoto, Tochigi-ken (JP); Yusuke Kawaguchi, Tochigi-ken (JP); Satoshi Sakamoto, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 298 days.

(21) Appl. No.: 16/634,889

(22) PCT Filed: Aug. 1, 2018

(86) PCT No.: PCT/JP2018/028780
§ 371 (c)(1),
(2) Date: Jan. 29, 2020

(87) PCT Pub. No.: WO2019/026936
PCT Pub. Date: Feb. 7, 2019

(65) Prior Publication Data
US 2020/0230560 A1    Jul. 23, 2020

(30) Foreign Application Priority Data

Aug. 1, 2017    (JP) .............................. JP2017-149086

(51) Int. Cl.
*B01F 27/70*    (2022.01)
*B01J 4/00*    (2006.01)
(Continued)

(52) U.S. Cl.
CPC ............ *B01F 27/70* (2022.01); *B01F 23/405* (2022.01); *B01F 23/43* (2022.01); *B01F 33/84* (2022.01);
(Continued)

(58) Field of Classification Search
CPC .. B01F 15/0203; B01F 15/02; B01F 15/0237; B01F 35/712; B01F 35/71;
(Continued)

(56) References Cited

U.S. PATENT DOCUMENTS

2009/0253019 A1    10/2009 Yokozawa
2014/0098629 A1    4/2014 Greter

FOREIGN PATENT DOCUMENTS

JP    03-196862    8/1991
JP    2008-002453    1/2008
JP    2008-023423    2/2008

OTHER PUBLICATIONS

Chinese Office Action for Chinese Patent Application No. 201880050249.X dated Jul. 19, 2021.
(Continued)

*Primary Examiner* — Marc C Howell
(74) *Attorney, Agent, or Firm* — Amin, Turocy & Watson, LLP

(57) ABSTRACT

A liquid-mixing apparatus used in a liquid-mixing method comprises a plurality of supply valves provided to a cylinder. The supply valves make it possible to individually supply a plurality of types of liquids into a retention chamber. Each of the supply valves is configured so as to be switchable between an open state, in which the interior of a supply channel via which a liquid is supplied and the interior of the retention chamber intercommunicate, and a closed state, in which communication between the supply channel and the retention chamber is blocked. A piston moves in the direc-
(Continued)

tion in which the volume of the retention chamber increases while at least one of the supply valves is in the open state, whereby a liquid is drawn into the storage chamber.

10 Claims, 27 Drawing Sheets

(51) Int. Cl.
  *B05B 7/32* (2006.01)
  *B01F 23/43* (2022.01)
  *B01F 23/40* (2022.01)
  *B01F 33/84* (2022.01)
  *B01F 35/71* (2022.01)
  *B01F 101/30* (2022.01)

(52) U.S. Cl.
  CPC .... *B01F 35/7174* (2022.01); *B01F 35/71805* (2022.01); *B01J 4/001* (2013.01); *B05B 7/32* (2013.01); *B01F 2101/30* (2022.01)

(58) Field of Classification Search
  CPC .... B01F 35/7174; B01F 3/0853; B01F 23/43; B01F 13/1055; B01F 33/84; B01J 4/001
  USPC ...................................................... 366/163.1
  See application file for complete search history.

(56) References Cited

OTHER PUBLICATIONS

International Search Report and Written Opinion for International Application No. PCT/JP2018/028780 dated Oct. 30, 2018, 9 pages.

LIQUID-MIXING APPARATUS AND LIQUID-MIXING METHOD

TECHNICAL FIELD

The present invention relates to a liquid mixing apparatus and a liquid mixing method for mixing a plurality of types of liquids.

BACKGROUND ART

For example, in Japanese Laid-Open Patent Publication No. 03-196862, a liquid mixing apparatus is proposed which is equipped with a stirring tank in which a plurality of colored paints are mixed and color adjusted. Such a liquid mixing apparatus includes a plurality of transfer pipes that mutually interconnect the stirring tank and a plurality of tanks in which paints of respective colors are stored. In addition, in each of the transfer pipes, a transfer pump and an electromagnetic valve are provided for transferring the paints stored in the respective tanks to the stirring tank.

SUMMARY OF INVENTION

However, in the above-described conventional technique, since it is necessary to provide the transfer pump and the solenoid valves in the plurality of transfer pipes, there is a concern that the apparatus as a whole will be increased in size together with increasing the number of component parts, leading to a steep rise in equipment costs.

The present invention has been devised taking into consideration the aforementioned problems, and has the object of providing a liquid mixing apparatus and a liquid mixing method, which are capable of making the apparatus as a whole compact in size and reducing equipment costs, and with a simple configuration, make it possible for accurate amounts of liquids to be introduced into the interior of a storage chamber.

In order to accomplish the aforementioned object, a liquid mixing apparatus according to the present invention is configured to mix a plurality of types of liquids, the liquid mixing apparatus comprising a cylinder, a piston slidably disposed in the interior of the cylinder so as to form, inside the cylinder, a storage chamber in which the plurality of types of liquids are capable of being stored, a stirring member disposed inside the storage chamber and which is capable of stirring the plurality of types of liquids inside the storage chamber, and a plurality of supply valves provided on the cylinder and which are capable of individually supplying the plurality of types of liquids into the storage chamber, wherein the liquids are drawn into the interior of the storage chamber from the supply valves, by the piston undergoing movement in a direction in which a volume inside the storage chamber increases.

In accordance with such a configuration, since the plurality of supply valves are provided on the cylinder, the apparatus as a whole can be made compact and equipment costs can be reduced. Further, since the plurality of types of liquids are individually drawn into the storage chamber by movement of the piston, with a simple configuration, precise amounts of the liquids can be introduced into the interior of the storage chamber.

In the above-described liquid mixing apparatus, the stirring member may further comprise a rotating shaft extending along an axial direction of the piston, and blade members extending radially outward from the rotating shaft, wherein the blade members may be located in the vicinity of an end surface of the cylinder that constitutes the storage chamber, and is positioned from an opposite side of the piston.

In accordance with such a configuration, the volume inside the storage chamber can be effectively reduced in size by placing the piston in close proximity to the blade members. Consequently, an accurate amount of a first type of liquid can be drawn into the storage chamber.

In the above-described liquid mixing apparatus, the plurality of supply valves may be disposed in the vicinity of the blade members.

In accordance with such a configuration, it is possible to prevent the supply valves from being covered by the piston in a state in which the piston is placed in close proximity to the blade members.

In the above-described liquid mixing apparatus, the plurality of supply valves may be positioned radially outward of the blade members in a radial direction of the rotating shaft, and may be spaced apart from each other in a circumferential direction.

In accordance with such a configuration, it is possible to more reliably prevent the supply valves from being covered by the piston in a state in which the piston is placed in close proximity to the blade members.

In the above-described liquid mixing apparatus, the plurality of supply valves may be disposed on the end surface of the cylinder.

In the above-described liquid mixing apparatus, an axis of the rotating shaft may be positioned on an axis of the piston.

A liquid mixing method according to the present invention is a method for mixing a plurality of types of liquids, the liquid mixing method comprising an introduction step of individually introducing the plurality of types of liquids into the interior of a storage chamber of a cylinder from a plurality of supply valves provided on the cylinder, and a mixing step of stirring the plurality of types of liquids introduced into the interior of the storage chamber by a stirring member disposed inside the storage chamber, wherein, in the introduction step, the liquids are drawn into the interior of the storage chamber from the supply valves, by a piston undergoing movement in a direction in which a volume inside the storage chamber increases.

In accordance with such a method, the same advantages and effects as those of the above-described liquid mixing apparatus can be realized.

In the above-described liquid mixing method, in the introduction step, the plurality of types of liquids may be drawn respectively into the storage chamber per each type sequentially one by one.

In accordance with such a method, the plurality of types of liquids can be drawn at predetermined amounts respectively into the interior of the storage chamber with high accuracy.

In the above-described liquid mixing method, the mixing step need not be performed during the introduction step, but may be performed after completion of the introduction step.

In accordance with such a method, in the introduction step, the liquids can be smoothly drawn into the interior of the storage chamber from each of the supply valves.

In the above-described liquid mixing method, the mixing step may be initiated during the introduction step.

In accordance with such a method, since the plurality of types of liquids are subjected to stirring while being drawn into the interior of the storage chamber, the time from initiation of the introduction step until completion of the mixing step can be made shorter.

According to the present invention, since the plurality of supply valves are provided on the cylinder, the apparatus as a whole can be made compact and equipment costs can be reduced. Further, since the plurality of types of liquids are individually drawn into the storage chamber by movement of the piston, with a simple configuration, precise amounts of the liquids can be introduced into the interior of the storage chamber.

DESCRIPTION OF EMBODIMENTS

Preferred embodiments of a liquid mixing apparatus according to the present invention, and a liquid mixing method in which the apparatus is used will be presented and described in detail below with reference to the accompanying drawings.

Figure 1:
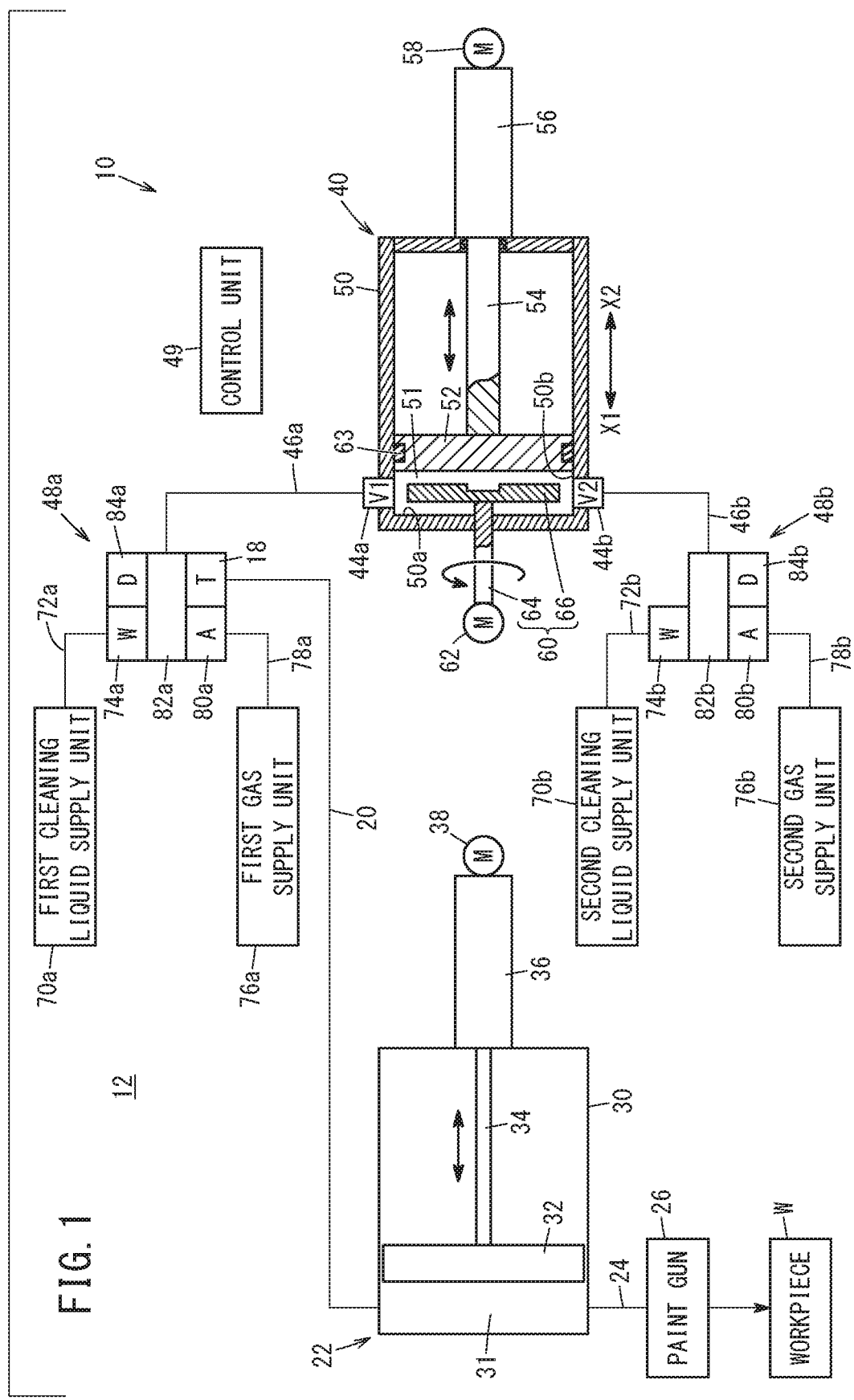
FIG. 1 is a schematic configuration diagram of a painting system equipped with a liquid mixing apparatus according to an embodiment of the present invention.
Figure 2:
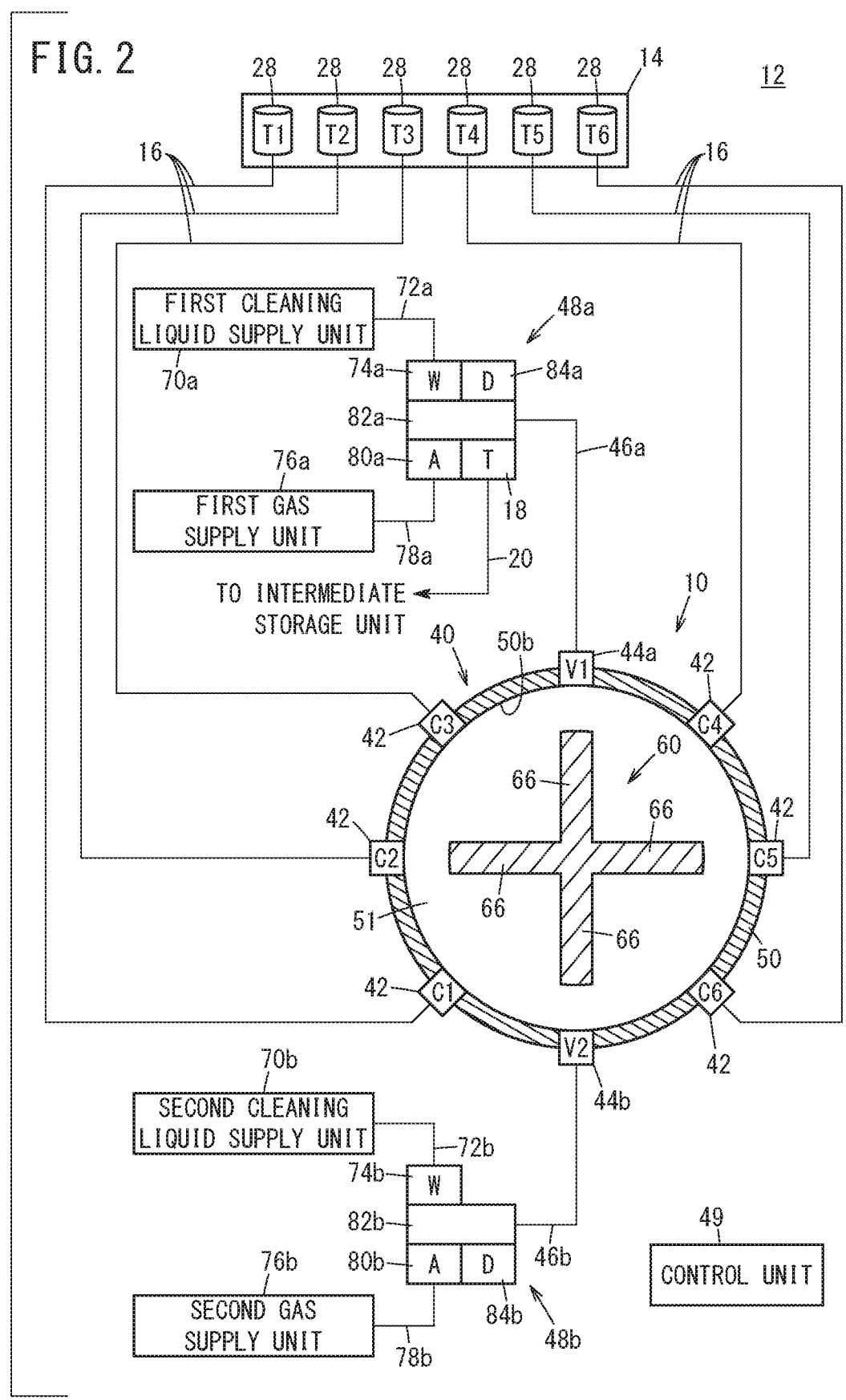
FIG. 2 is a schematic diagram showing a cross-sectional view of the liquid mixing apparatus shown in FIG. 1.

As shown in FIGS. 1 and 2, a liquid mixing apparatus 10 according to an embodiment of the present invention is configured as a paint mixing apparatus for mixing and color matching a plurality of colored paints that are in the form of liquids. The liquid mixing apparatus 10 is incorporated in a painting system 12 that applies or coats a mixed paint, which is obtained by mixing and color matching the plurality of colored paints, onto a workpiece W such as a vehicle body. The mixed paint, for example, may be a paint used as an undercoat for a workpiece W, or may be a paint used as an overcoat for the workpiece W.

The liquid mixing apparatus 10 is not limited to being an apparatus that mixes the plurality of colored paints, and may be any apparatus insofar as it is capable of mixing a plurality of types of liquids. More specifically, the liquid mixing apparatus 10 may be an apparatus that is capable of mixing a curing agent with a predetermined liquid.

First, a description will be given concerning the painting system 12. The painting system 12 includes a painting materials supply unit 14, a plurality of supply passages 16, the liquid mixing apparatus 10, a trigger valve 18, a transfer passage 20, an intermediate storage unit 22, a painting material passage 24, and a paint gun 26.

As shown in FIG. 2, the painting materials supply unit 14 serves to supply the plurality of colored paints to the liquid mixing apparatus 10, and includes a plurality of tanks 28 (six in the example of FIG. 2) in which paints of respective colors are stored. The respective supply passages 16 connect each of the tanks 28 and the liquid mixing apparatus 10 to each other. Stated otherwise, the paints stored in the respective tanks 28 are supplied to the liquid mixing apparatus 10 through the supply passages 16. The detailed configuration of the liquid mixing apparatus 10 will be described later.

As shown in FIG. 1, the transfer passage 20 is a passage for transferring the mixed paint obtained by the liquid mixing apparatus 10 into the intermediate storage unit 22. The intermediate storage unit 22 serves to store the mixed paint. The intermediate storage unit 22 includes an intermediate cylinder 30, an intermediate piston 32, an intermediate rod 34, a motive power conversion unit 36, and a drive source 38.

The intermediate piston 32 is slidably disposed inside the intermediate cylinder 30 so as to form an intermediate storage chamber 31 in which the mixed paint can be stored. The intermediate rod 34 is connected to a surface of the intermediate piston 32 on a side opposite from the intermediate storage chamber 31. The motive power conversion unit 36 is connected to the intermediate rod 34. The drive source 38 is a servomotor that causes the intermediate piston 32 to move along the axial direction. Rotational motion of the drive source 38 is converted into linear motion by the motive power conversion unit 36, and the linear motion is transmitted to the intermediate piston 32 via the intermediate rod 34.

The painting material passage 24 is a passage through which the mixed paint inside the intermediate storage chamber 31 is guided to the paint gun 26. The paint gun 26 serves to paint or coat the workpiece W with the mixed paint that is guided from the painting material passage 24, and is installed, for example, on a non-illustrated robot arm. The paint gun 26 can be constituted, for example, by a known rotary atomizing type of paint gun.

As shown in FIGS. 1 and 2, the liquid mixing apparatus 10 serves to mix and color match the plurality of colored paints (for mixing a plurality of types of liquids). The liquid mixing apparatus 10 is equipped with a mixing apparatus main body 40, a plurality of supply valves 42, a first opening/closing valve 44a, a first passage 46a, a first cleaning system 48a, a second opening/closing valve 44b, a second passage 46b, a second cleaning system 48b, and a control unit 49.

As shown in FIG. 1, the mixing apparatus main body 40 includes a cylinder 50, a piston 52, a rod 54, a motive power conversion unit 56, a drive source 58, a stirring member 60, and a stirring drive unit 62.

The cylinder 50 is disposed (oriented horizontally) in a manner so that the axis thereof is positioned substantially horizontally. In the interior of the cylinder 50, a piston 52 is slidably disposed along the axial direction in a manner so that a storage chamber 51 is formed in which the plurality of colored paints are capable of being stored.

An annular seal member 63, which is in liquid-tight contact with an inner circumferential surface 50b of the cylinder 50, is mounted via an annular groove on an outer circumferential surface of the piston 52. The rod 54 is connected to a surface of the piston 52 on an opposite side from the storage chamber 51. The motive power conversion unit 56 is connected to the rod 54. The drive source 58 is a servomotor that causes the piston 52 to move along the axial direction. Rotational motion of the drive source 58 is converted into linear motion by the motive power conversion unit 56, and the linear motion is transmitted to the piston 52 via the rod 54.

As shown in FIGS. 1 and 2, the stirring member 60 is provided inside the storage chamber 51, and is capable of stirring the plurality of colored paints inside the storage chamber 51. The stirring member 60 has a rotating shaft 64 and a plurality of blade members 66. The rotating shaft 64 extends along the axial direction of the piston 52. More specifically, in a state of being positioned on the axis of the piston 52, the rotating shaft 64 extends so as to penetrate through an end surface 50a of the cylinder 50 (the end surface 50a in the direction of the arrow X1 of the cylinder 50) that constitutes the storage chamber 51, and is positioned from an opposite side of the piston 52. The respective blade members 66 extend radially outward from the rotating shaft 64.

The plurality of blade members 66 are disposed at equal intervals in the circumferential direction of the rotating shaft 64. In FIG. 2, an example is shown in which four blade members 66 are provided. However, the number of blade members 66 can be set arbitrarily, and one, two, three, or five or more blade members may be provided. Ends (outer ends) in the radial outward direction of the blade members 66 are separated from the inner circumferential surface 50b of the cylinder 50 that constitutes the storage chamber 51. The blade members 66 are located in the vicinity of the end surface 50a of the cylinder 50. Based on a signal from the control unit 49, the stirring drive unit 62 causes the rotating shaft 64 to be rotated.

The plurality of supply valves 42 serve to individually supply the plurality of colored paints into the storage chamber 51, and are disposed on the inner circumferential surface 50b of the cylinder 50 that constitutes the storage chamber 51. The plurality of supply passages 16 are connected respectively to each of the supply valves 42. Based on signals from the control unit 49, the respective supply valves 42 are configured to switch between an open state in which the interiors of the supply passages 16 and the interior of the storage chamber 51 are in communication with each other, and a closed state in which communication between the interiors of the supply passages 16 and the interior of the storage chamber 51 is blocked.

The plurality of supply valves 42 are disposed in the vicinity of the blade members 66. The plurality of supply valves 42 are positioned radially outward of the blade members 66 in a radial direction of the rotating shaft 64, and are spaced apart from each other in the circumferential direction. In FIG. 2, an example is shown in which six supply valves 42 are provided. However, the number of supply valves 42 can be set arbitrarily insofar as two or more of them are provided.

The first opening/closing valve 44a is disposed on the inner circumferential surface 50b of the cylinder 50 that constitutes the storage chamber 51. The first passage 46a is connected to the first opening/closing valve 44a. Based on a signal from the control unit 49, the first opening/closing valve 44a is configured to switch between an open state in which the interior of the first passage 46a and the interior of the storage chamber 51 are in communication with each other, and a closed state in which communication between the interior of the first passage 46a and the interior of the storage chamber 51 is blocked.

The first opening/closing valve 44a is located in the vicinity of the end surface 50a of the cylinder 50 and positioned above the blade members 66 (stirring member 60). Stated otherwise, the first opening/closing valve 44a is positioned on an upper end (uppermost portion) of the inner circumferential surface 50b of the cylinder 50 that constitutes the storage chamber 51. The first opening/closing valve 44a functions as an air discharging unit that enables the air inside the storage chamber 51 to be discharged to the exterior. In this case, the first passage 46a functions as a discharge passage through which the air is guided to the exterior.

Further, the first opening/closing valve 44a functions as a first cleaning valve (first cleaning unit) that supplies a cleaning liquid and a gas toward the blade members 66. Water may be used, for example, as the cleaning liquid. Air may be used, for example, as the gas. However, the cleaning liquid and the gas are not limited to being water and air. The first opening/closing valve 44a is configured to be capable of supplying the cleaning liquid and the gas toward the blade members 66, and to be capable of discharging the gas.

The first passage 46a is a passage that interconnects the first opening/closing valve 44a and the first cleaning system 48a to each other. The first cleaning system 48a includes a first cleaning liquid supply unit 70a, a first cleaning liquid passage 72a, a first cleaning liquid supply valve 74a, a first gas supply unit 76a, a first gas passage 78a, a first gas supply valve 80a, a first port 82a, and a first drain valve 84a.

The first cleaning liquid supply unit 70a serves to supply a pressurized cleaning liquid to the first cleaning liquid supply valve 74a. The first cleaning liquid supply unit 70a can be constituted by including a water pump, for example. Based on a signal from the control unit 49, the first cleaning liquid supply valve 74*a* is configured to switch between an open state in which the interior of the first cleaning liquid passage 72*a* and the first port 82*a* are in communication with each other, and a closed state in which communication between the interior of the first cleaning liquid passage 72*a* and the first port 82*a* is blocked.

The first gas supply unit 76*a* serves to supply a pressurized gas to the first gas supply valve 80*a*. The first gas supply unit 76*a* can be constituted by including an air pump, for example. Based on a signal from the control unit 49, the first gas supply valve 80*a* is configured to switch between an open state in which the interior of the first gas passage 78*a* and the first port 82*a* are in communication with each other, and a closed state in which communication between the interior of the first gas passage 78*a* and the first port 82*a* is blocked.

The first port 82*a* communicates with the first passage 46*a*. The first drain valve 84*a* serves to discharge to the exterior via the first passage 46*a* the gas that was guided to the first port 82*a* from the interior of the storage chamber 51. Based on a signal from the control unit 49, the first drain valve 84*a* is configured to switch between an open state in which a non-illustrated drain passage and the first port 82*a* are in communication with each other, and a closed state in which communication between the drain passage and the first port 82*a* is blocked. The first port 82*a* communicates with the transfer passage 20 via the trigger valve 18. Based on a signal from the control unit 49, the trigger valve 18 is configured to switch between an open state in which the first port 82*a* and the interior of the transfer passage 20 are in communication with each other, and a closed state in which communication between the first port 82*a* and the interior of the transfer passage 20 is blocked.

The second opening/closing valve 44*b* is located in the vicinity of the end surface 50*a* of the cylinder 50, and positioned below the blade members 66 (stirring member 60). Stated otherwise, the second opening/closing valve 44*b* is positioned on a lowermost end (lowermost portion) of the inner circumferential surface 50*b* of the cylinder 50 that constitutes the storage chamber 51.

The second opening/closing valve 44*b* functions as a second cleaning valve (second cleaning unit) that supplies the cleaning liquid and the gas toward the blade members 66. The second opening/closing valve 44*b* is configured to be capable of supplying the cleaning liquid and the gas toward the blade members 66, and to be capable of discharging the gas. The blade members 66, the first opening/closing valve 44*a*, and the second opening/closing valve 44*b* are positioned on a common plane that lies perpendicular to the axis of the cylinder 50.

The second passage 46*b* is a passage that interconnects the second opening/closing valve 44*b* and the second cleaning system 48*b* to each other. The second cleaning system 48*b* includes a second cleaning liquid supply unit 70*b*, a second cleaning liquid passage 72*b*, a second cleaning liquid supply valve 74*b*, a second gas supply unit 76*b*, a second gas passage 78*b*, a second gas supply valve 80*b*, a second port 82*b*, and a second drain valve 84*b*.

The second cleaning liquid supply unit 70*b* serves to supply a pressurized cleaning liquid to the second cleaning liquid supply valve 74*b*. The second cleaning liquid supply unit 70*b* is configured in the same manner as the above-described first cleaning liquid supply unit 70*a*. Based on a signal from the control unit 49, the second cleaning liquid supply valve 74*b* is configured to switch between an open state in which the interior of the second cleaning liquid passage 72*b* and the second port 82*b* are in communication with each other, and a closed state in which communication between the interior of the second cleaning liquid passage 72*b* and the second port 82*b* is blocked.

The second gas supply unit 76*b* serves to supply a pressurized gas to the second gas supply valve 80*b*. The second gas supply unit 76*b* is configured in the same manner as the above-described first gas supply unit 76*a*. Based on a signal from the control unit 49, the second gas supply valve 80*b* is configured to switch between an open state in which the interior of the second gas passage 78*b* and the second port 82*b* are in communication with each other, and a closed state in which communication between the interior of the second gas passage 78*b* and the second port 82*b* is blocked.

The second port 82*b* communicates with the second passage 46*b*. The second drain valve 84*b* serves to discharge to the exterior via the second passage 46*b* the cleaning liquid and the gas that were guided to the second port 82*b* from the interior of the storage chamber 51. Based on a signal from the control unit 49, the second drain valve 84*b* is configured to switch between an open state in which a non-illustrated drain passage and the second port 82*b* are in communication with each other, and a closed state in which communication between the drain passage and the second port 82*b* is blocked.

The control unit 49 controls the plurality of supply valves 42 and the pistons 52 in a manner so that the plurality of colored paints are drawn respectively into the storage chamber 51 per each type sequentially one by one. Further, the control unit 49 functions as a pressure adjusting unit which is capable of reducing the pressure inside the storage chamber 51, in a manner so that the pressure inside the storage chamber 51 becomes lower than the pressure inside the tanks 28 in which the liquids supplied to the supply passages 16 are stored.

Next, a description will be given in relation to a liquid mixing method concerning operations of the liquid mixing apparatus 10. In an initial state, the piston 52 of the liquid mixing apparatus 10 is positioned at an end (in the direction of the arrow X1) where the stirring member 60 is located. In other words, the piston 52 is positioned in the vicinity of the blade members 66, whereby the volume inside the storage chamber 51 is minimized.

Figure 3:
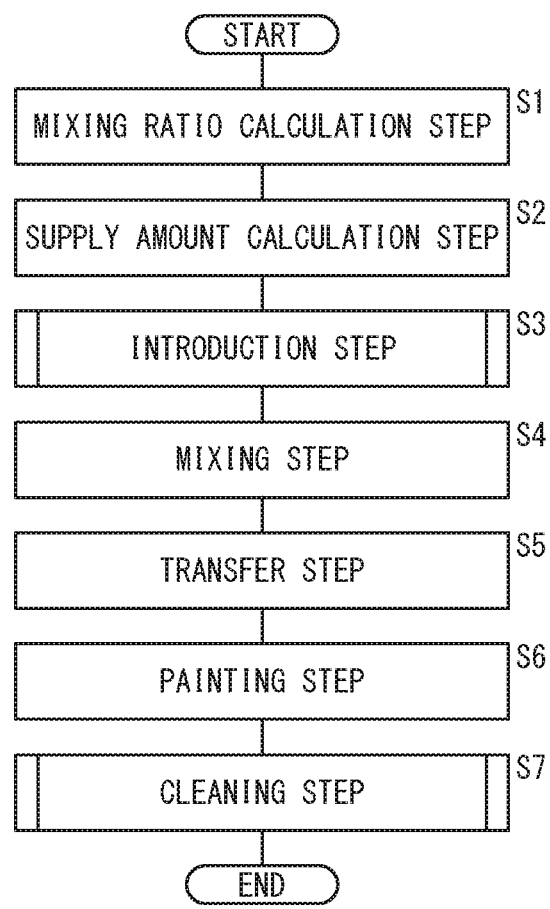
FIG. 3 is a flowchart for describing a liquid mixing method in which the liquid mixing apparatus shown in FIG. 1 is used.

In the liquid mixing method, first, as shown in FIG. 3, a mixing ratio calculation step is performed (step S1). In the mixing ratio calculation step, on the basis of predetermined painting material information, the control unit 49 calculates a mixing ratio of the colored paints which is necessary for color matching to be performed.

Thereafter, a supply amount calculation step is performed (step S2). In the supply amount calculation step, based on the calculated mixing ratio, the control unit 49 calculates supply amounts for the respective paints.

Figure 4:
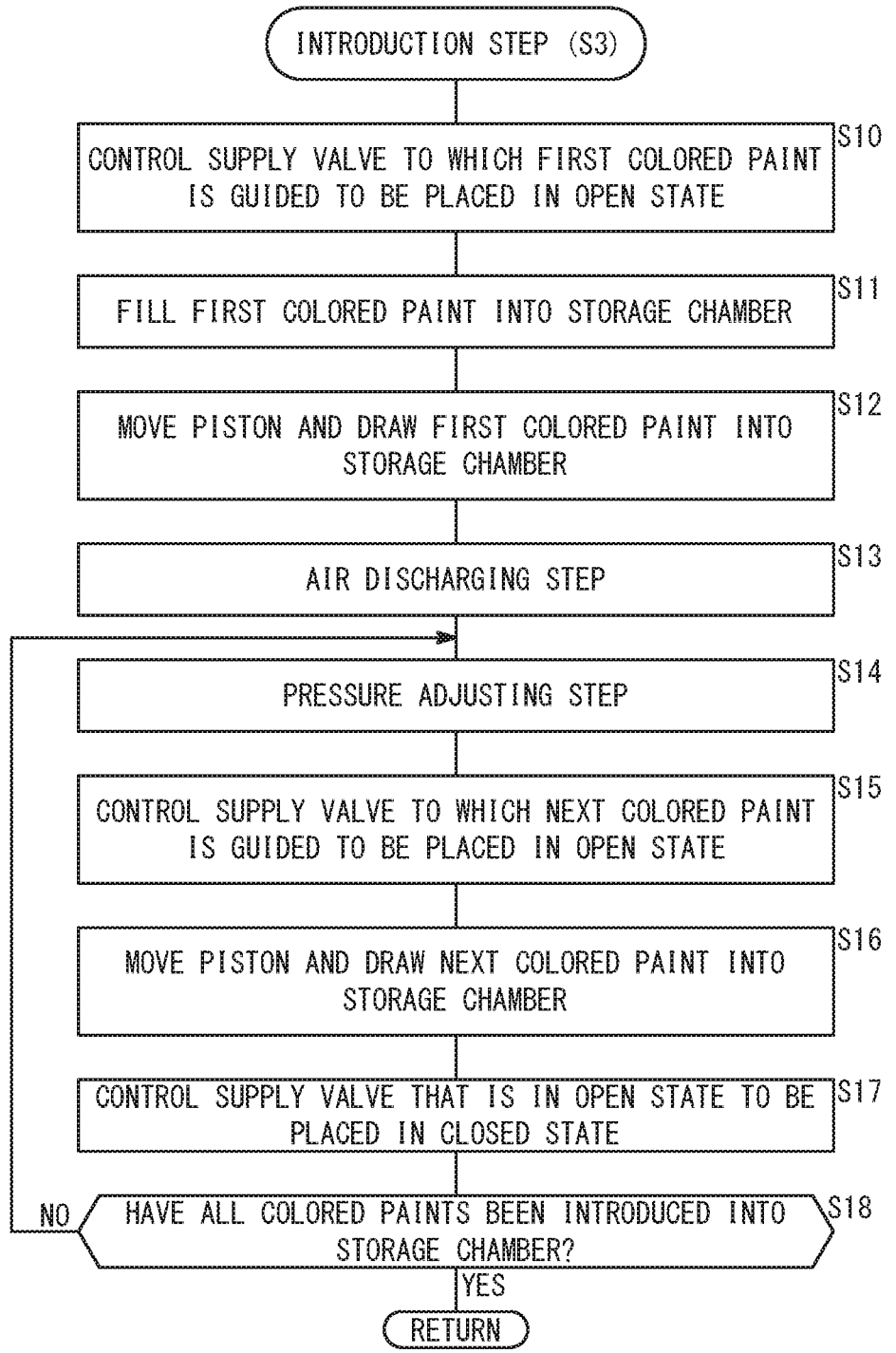
FIG. 4 is a flowchart for describing an introduction step of FIG. 3.

Subsequently, an introduction step is performed (step S3). In the introduction step, the respective colored paints are introduced into the interior of the storage chamber 51 per each color sequentially one by one on the basis of the calculated supply amounts. More specifically, as shown in FIG. 4, in the introduction step, the control unit 49 controls the supply valve 42, to which the first colored paint is guided, so as to be placed in an open state (step S10). Moreover, for the first colored paint, an amount of paint that is greater than the minimum volume inside the storage chamber 51 is selected. Further, the control unit 49 controls all of the other supply valves 42 and the second opening/closing valve 44*b* to be placed in a closed state, while controlling the first opening/closing valve 44a and the first drain valve 84a to be placed in an open state.

Figure 6:
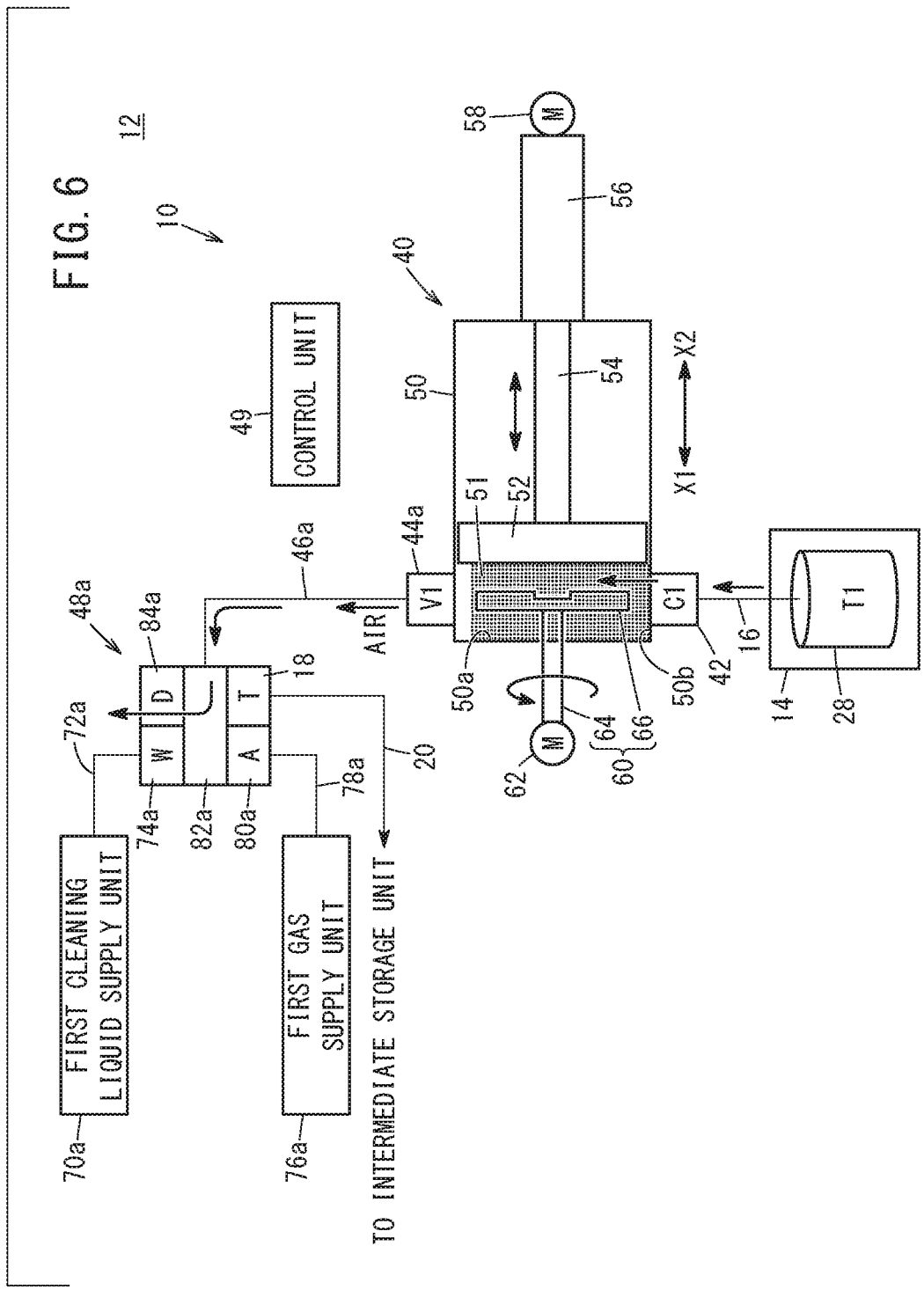
FIG. 6 is a first explanatory diagram showing a state in which a first colored paint is filled inside a storage chamber.
Figure 7:
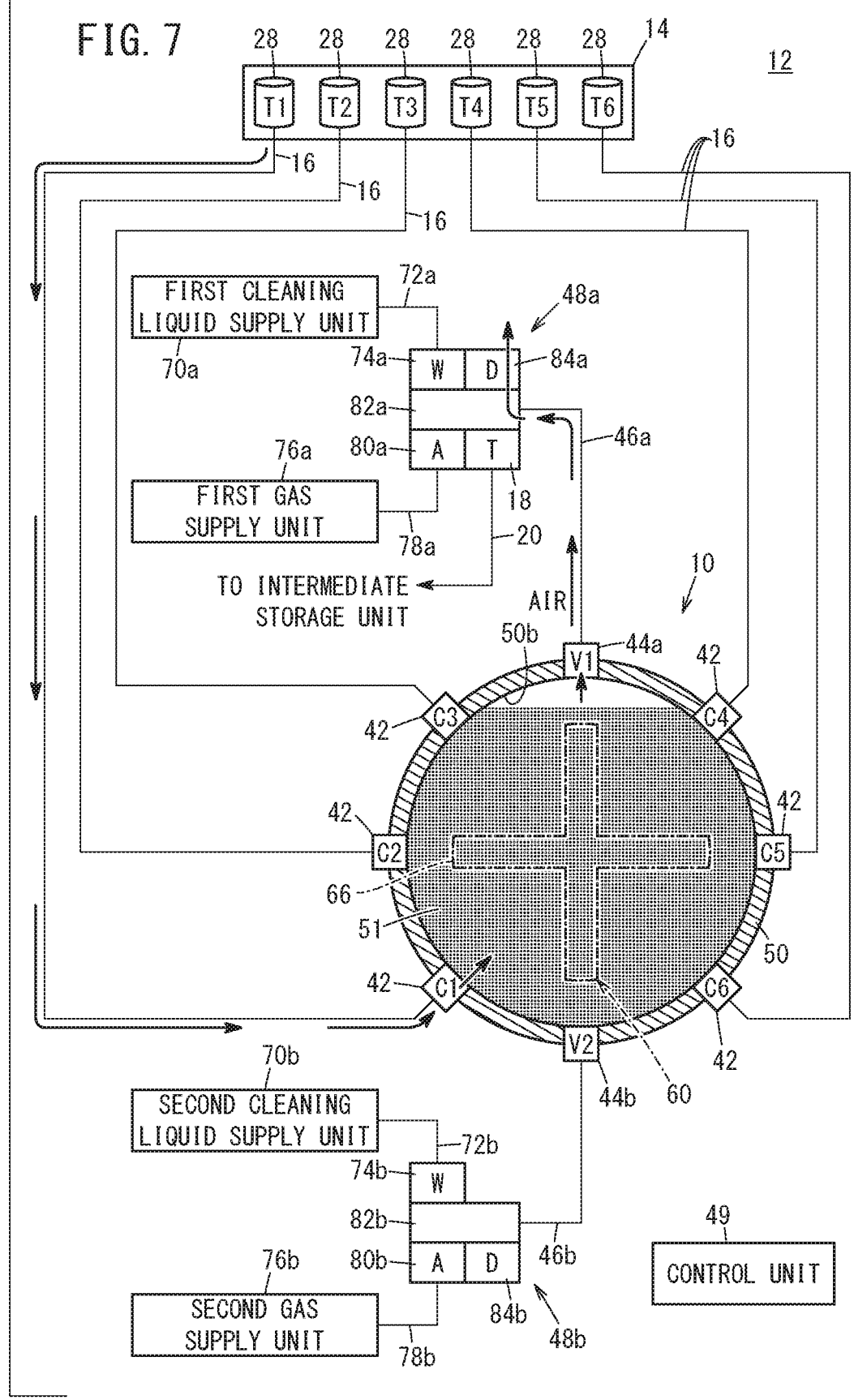
FIG. 7 is a second explanatory diagram showing a state in which the first colored paint is filled inside the storage chamber.

Consequently, as shown in FIGS. 6 and 7, the first colored paint is filled inside the storage chamber 51 from a predetermined tank 28 via the supply passage 16 and the supply valve 42 (step S11). At this time, the air inside the storage chamber 51 is pushed by the paint and is discharged to the exterior through the first opening/closing valve 44a, the first passage 46a, the first port 82a, and the first drain valve 84a.

In addition, when the first colored paint is filled inside the storage chamber 51, the control unit 49 controls the drive source 58, and causes the piston 52 to move by a predetermined length in a direction (the direction of the arrow X2) to increase the volume inside the storage chamber 51. Consequently, the first colored paint that is stored in a predetermined tank 28 is drawn into the storage chamber 51 via the supply passage 16 and the supply valve 42 (step S12 of FIG. 4). At this time, the control unit 49 causes the piston 52 to move in a manner so that a greater amount of paint than the calculated supply amount for the first colored paint is introduced into the interior of the storage chamber 51.

Figure 8:
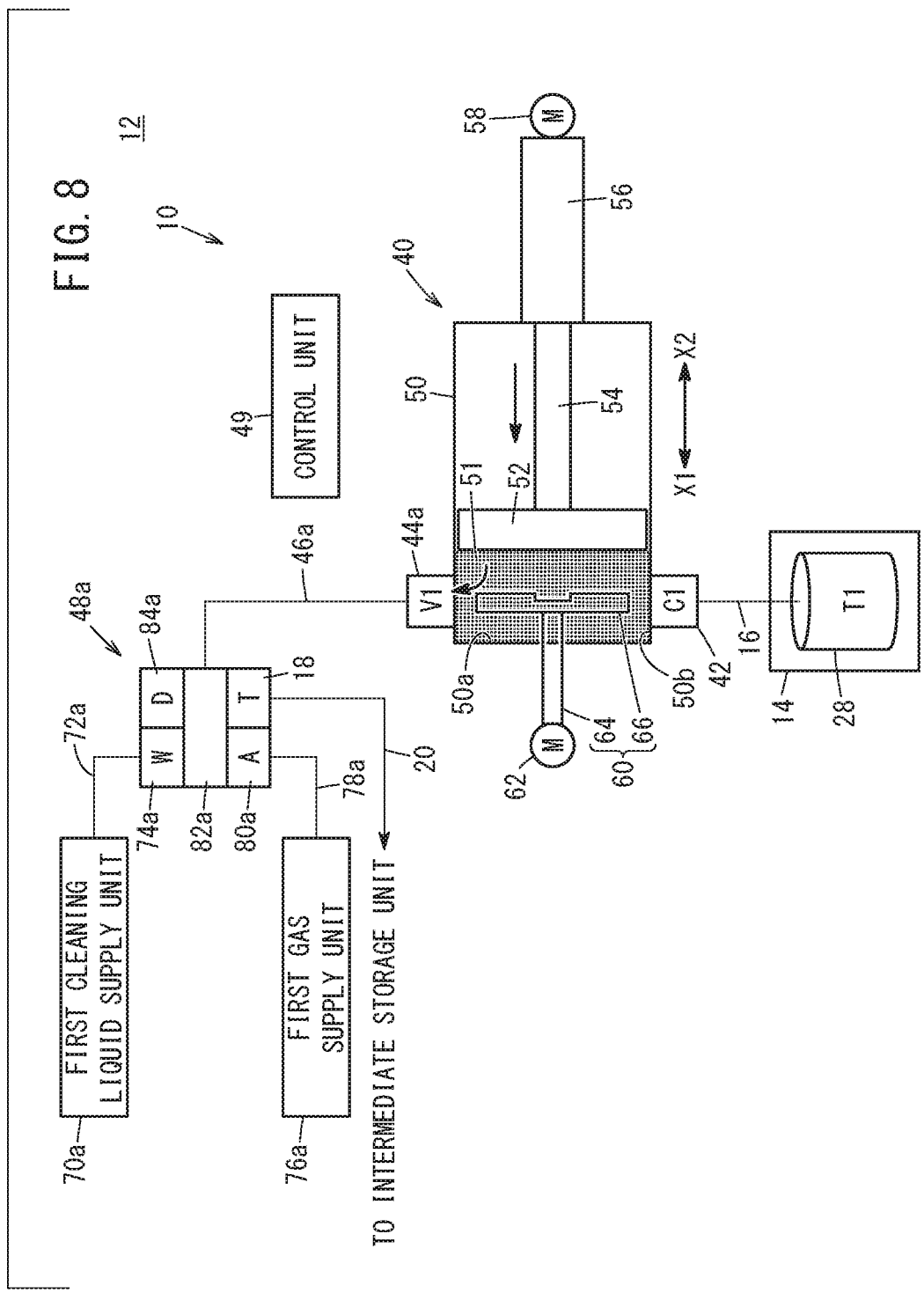
FIG. 8 is an explanatory diagram of an air discharging step.

Thereafter, as shown in FIG. 4, an air discharging step is performed (step S13). In the air discharging step, the control unit 49 controls the first opening/closing valve 44a to be placed in an open state, while controlling the drive source 58 to cause the piston 52 to move in a direction (the direction of the arrow X1) in which the volume inside the storage chamber 51 is reduced (see FIG. 8). Consequently, the air remaining inside the storage chamber 51 is discharged to the exterior of the storage chamber 51 through the first opening/closing valve 44a. In the air discharging step, the control unit 49 introduces the paint inside the storage chamber 51 into the first opening/closing valve 44a, together with causing the piston 52 to move until the first colored paint inside the storage chamber 51 reaches the amount calculated in the supply amount calculation step.

Subsequently, a pressure adjusting step is performed (step S14). In the pressure adjusting step, the control unit 49 causes the piston 52 to move by a predetermined length in a direction (the direction of the arrow X2) to increase the volume inside the storage chamber 51, in a state in which all of the supply valves 42, the first opening/closing valve 44a, and the second opening/closing valve 44b are controlled to be placed in a closed state. Consequently, the pressure (fluid pressure) inside the storage chamber 51 is made lower than the pressures (fluid pressures) in each of the tanks 28. The amount of movement of the piston 52 in the pressure adjusting step can be set arbitrarily, and may be larger or smaller than the amount of movement of the piston 52 when the next colored paints are to be introduced into the interior of the storage chamber 51.

Thereafter, a next colored (second or subsequent colored) paint is introduced into the interior of the storage chamber 51. More specifically, the control unit 49 controls the supply valve 42 to which the next colored paint is guided to be placed in an open state (step S15). At this time, the control unit 49 controls all of the other supply valves 42, the first opening/closing valve 44a, and the second opening/closing valve 44b to be placed in a closed state. In addition, the control unit 49 controls the drive source 58, and causes the piston 52 to move by a predetermined length in a direction (the direction of the arrow X2) to increase the volume inside the storage chamber 51. Consequently, the next colored paint that is stored in a predetermined tank 28 is drawn into the storage chamber 51 via the supply passage 16 and the supply valve 42 (step S16). Subsequently, the control unit 49 controls the supply valve 42 that is in an open state to be placed in a closed state (step S17).

Figure 9:
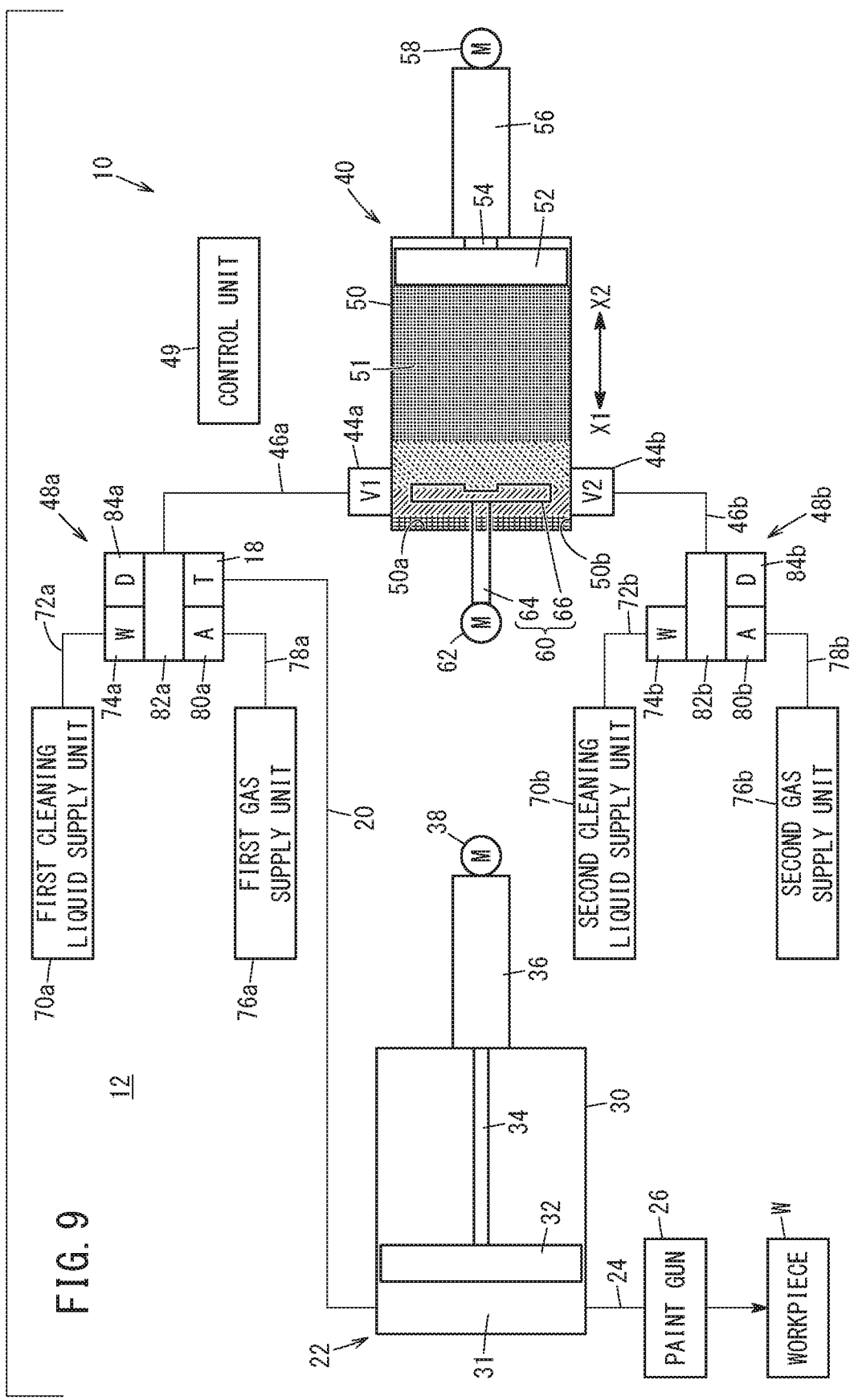
FIG. 9 is an explanatory diagram illustrating a state in which a plurality of colored paints are introduced into the storage chamber.

Next, the control unit 49 determines whether or not all of the colored paints have been introduced into the interior of the storage chamber 51 (step S18). In the case it is determined by the control unit 49 that all of the colored paints have not been introduced into the interior of the storage chamber 51 (step S18: NO), steps S14 to S17 are sequentially performed again. On the other hand, as shown in FIG. 9, in the case it is determined by the control unit 49 that all of the colored paints have been introduced into the interior of the storage chamber 51 (step S18: YES), the introduction step is brought to an end. It should be noted that, although in FIG. 9, an example is shown in which four colored paints are introduced into the interior of the storage chamber 51, the number of colored paints that are introduced into the interior of the storage chamber 51 can be arbitrarily set.

Figure 10:
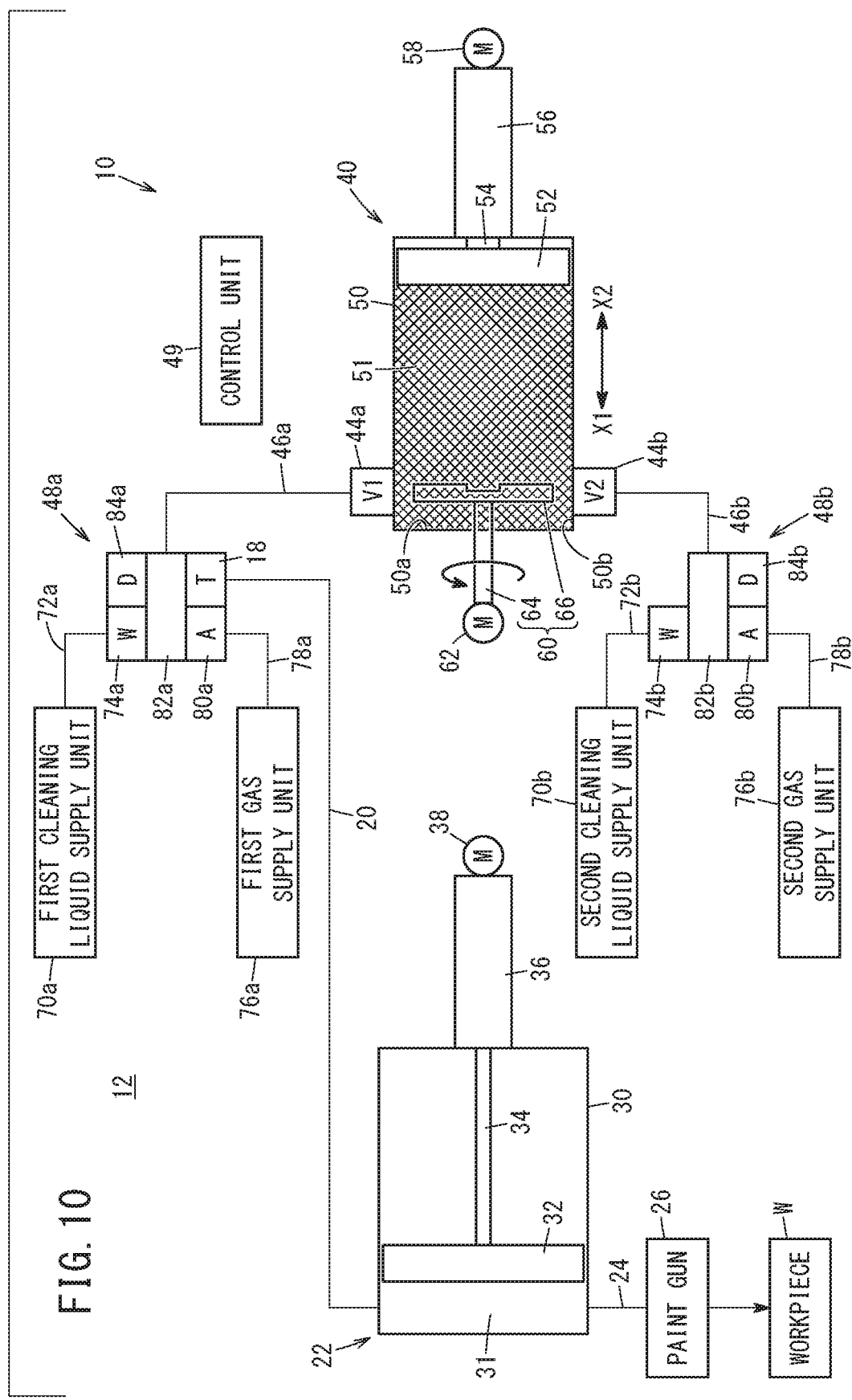
FIG. 10 is an explanatory diagram of a mixing step.

Upon completion of the introduction step, the mixing step shown in FIG. 3 is performed (step S4). In the mixing step, the control unit 49 drives the stirring drive unit 62 to thereby rotate the stirring member 60 (see FIG. 10). Consequently, since the blade members 66 are rotated inside the storage chamber 51, the mixed paint is manufactured by mixing and color adjusting the plurality of colored paints in the interior of the storage chamber 51. Upon completion of the mixing step, the control unit 49 terminates driving of the stirring drive unit 62.

Figure 11:
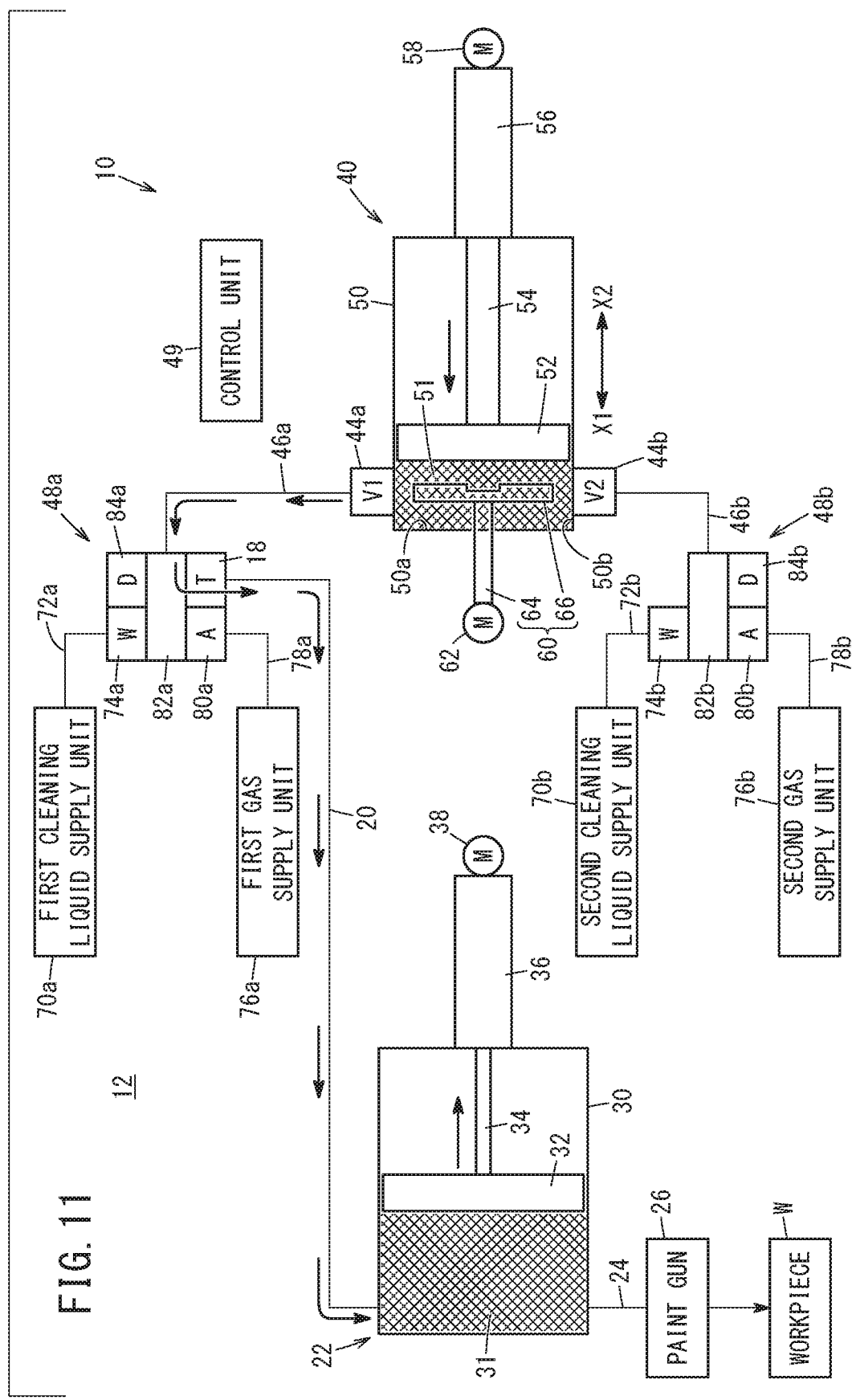
FIG. 11 is an explanatory diagram of a transfer step.

Thereafter, a transfer step is performed (step S5). In the transfer step, the control unit 49 controls all of the supply valves 42 and the second opening/closing valve 44b to be placed in a closed state, while controlling the first opening/closing valve 44a and the trigger valve 18 to be placed in an open state. Further, the control unit 49 drives the drive source 58 to thereby cause the piston 52 to move in a direction (the direction of the arrow X1) in which the volume inside the storage chamber 51 is reduced, together with driving the drive source 38 to cause the intermediate piston 32 to move in a direction in which the volume inside the intermediate storage chamber 31 increases. Upon doing so, the mixed paint inside the storage chamber 51 is transferred into the intermediate storage chamber 31 via the first opening/closing valve 44a, the first passage 46a, the trigger valve 18, and the transfer passage 20 (see FIG. 11). Upon completion of the transfer step, the control unit 49 terminates driving of the drive source 58 and the drive source 38, while controlling the trigger valve 18 to be placed in a closed state.

Subsequently, a painting step is performed (step S6). In the painting step, the control unit 49 drives the drive source 38 to thereby cause the intermediate piston 32 to move in a direction in which the interior of the intermediate storage chamber 31 is reduced. Consequently, the mixed paint inside the intermediate storage chamber 31 is guided to the paint gun 26 and is painted onto the workpiece W.

Figure 5:
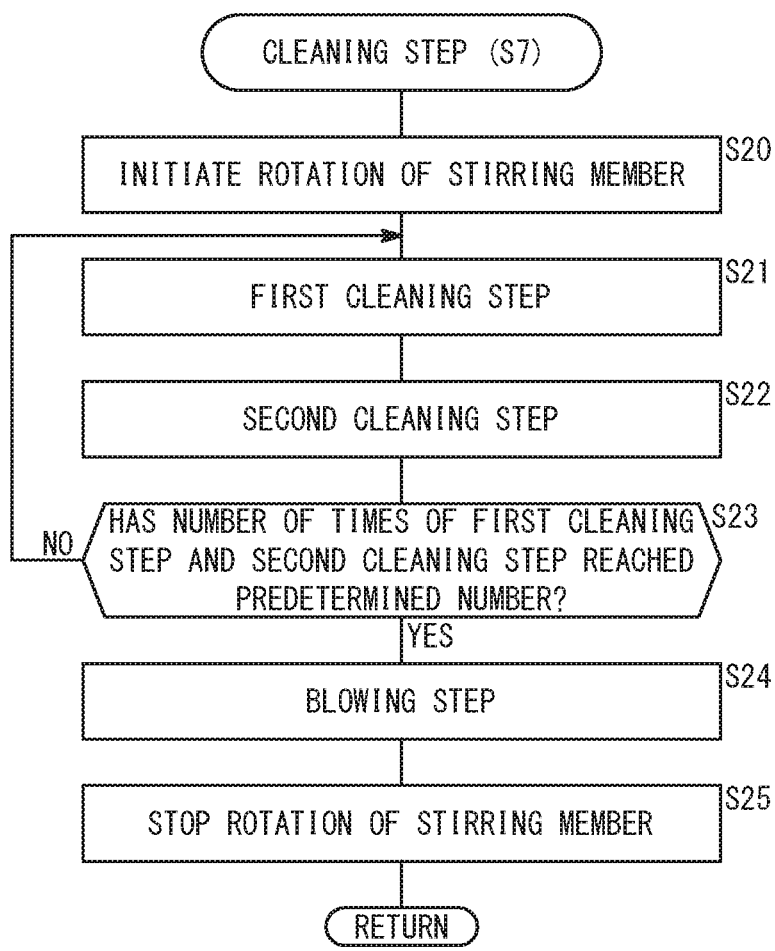
FIG. 5 is a flowchart for describing a cleaning step of FIG. 3.

Further, upon completion of the painting step, a cleaning step is performed (step S7). However, the cleaning step may also be performed during the painting step, or may be performed before initiation of the painting step. As shown in FIG. 5, in the cleaning step, in a state in which the piston 52 is positioned so that the volume inside the storage chamber 51 is minimized, the control unit 49 drives the stirring drive unit 62 and initiates rotation of the stirring member 60 (step S20). Moreover, the stirring member 60 may be continuously rotated until the cleaning step, without stopping rotation of the stirring member 60 upon completion of the mixing step. In this case, step S20 is rendered unnecessary.

Then, the first cleaning step is performed (step S21). In the first cleaning step, the control unit 49 controls all of the supply valves 42 to be placed in a closed state, while controlling the first opening/closing valve 44a and the second opening/closing valve 44b to be placed in an open state. Further, the control unit 49 controls the first cleaning liquid supply valve 74a and the second gas supply valve 80b to be placed in an open state, while controlling the first gas supply valve 80a and the second cleaning liquid supply valve 74b to be placed in a closed state. Furthermore, the control unit 49 controls the first drain valve 84a to be placed in a closed state, while controlling the second drain valve 84b to be placed in an open state.

Figure 12:
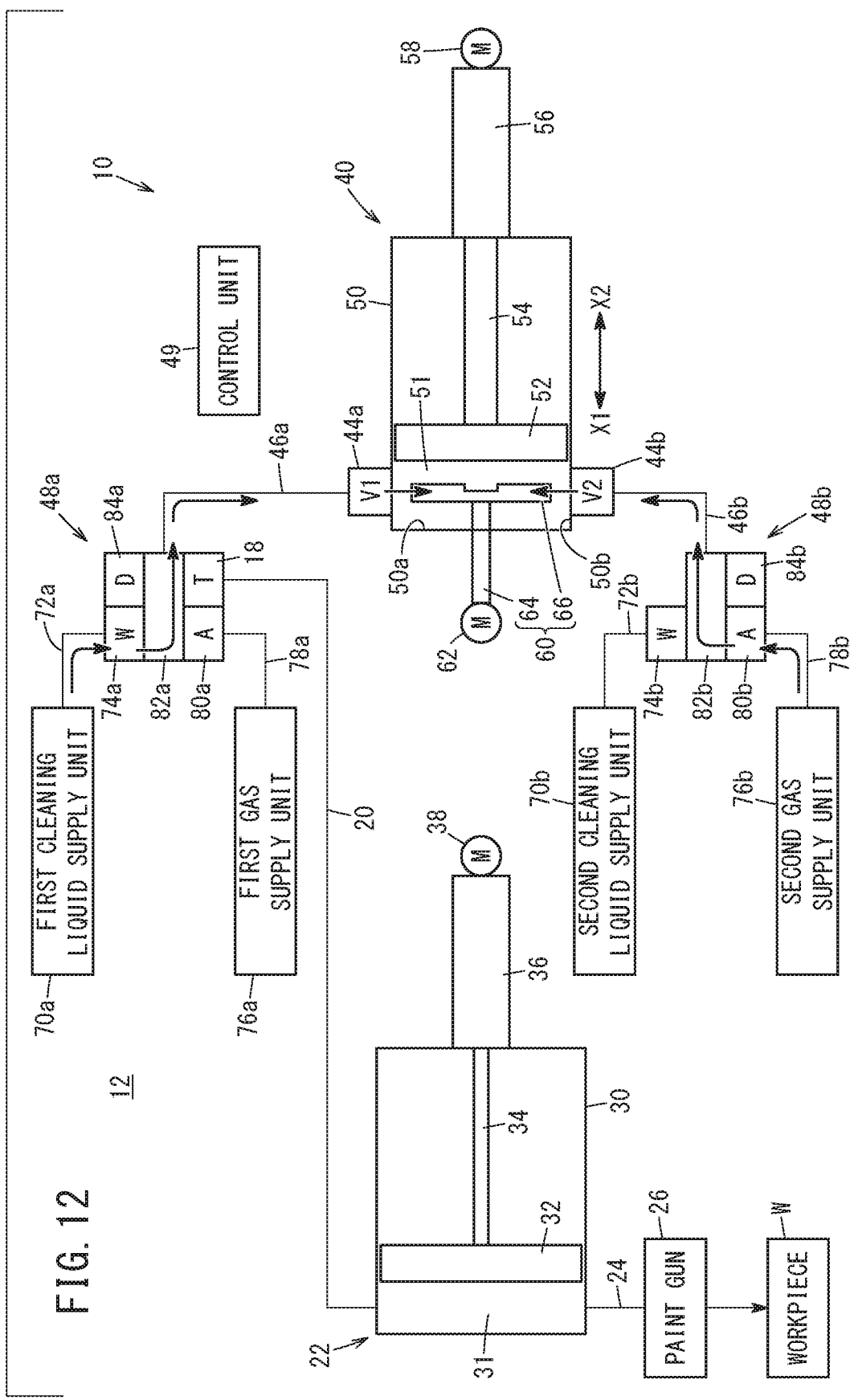
FIG. 12 is an explanatory diagram of a first cleaning step.

Upon doing so, as shown in FIG. 12, the cleaning liquid in the first cleaning liquid supply unit 70a is discharged toward the blade members 66 via the first cleaning liquid passage 72a, the first cleaning liquid supply valve 74a, the first port 82a, the first passage 46a, and the first opening/closing valve 44a. The gas in the second gas supply unit 76b is discharged toward the blade members 66 via the second gas passage 78b, the second gas supply valve 80b, the second port 82b, the second passage 46b, and the second opening/closing valve 44b. Stated otherwise, the cleaning liquid is supplied from above the blade members 66, and the gas is supplied from below the blade members 66. Consequently, paint adhering to the rotating blade members 66, and paint adhering to the inner surface of the storage chamber 51 is effectively removed.

Further, in the first cleaning step, the cleaning liquid and the gas inside the storage chamber 51 may be intermittently discharged to the exterior via the second opening/closing valve 44b, the second passage 46b, the second port 82b, and the second drain valve 84b. In this case, the control unit 49 controls the first cleaning liquid supply valve 74a and the second gas supply valve 80b to be placed in a closed state, while controlling the trigger valve 18 and the second drain valve 84b to be placed in an open state. Further, the drive source 38 is driven to thereby cause the intermediate piston 32 to move in a direction in which the volume inside the intermediate storage unit 22 is reduced. Upon doing so, the air inside the intermediate storage unit 22 is guided into the interior of the storage chamber 51 via the transfer passage 20, the trigger valve 18, the first port 82a, the first passage 46a, and the first opening/closing valve 44a. Consequently, by the air that is introduced from the first opening/closing valve 44a, the cleaning liquid inside the storage chamber 51 is discharged to the exterior through the second opening/closing valve 44b, the second passage 46b, the second port 82b, and the second drain valve 84b.

As shown in FIG. 5, upon completion of the first cleaning step, a second cleaning step is performed (step S22). In the second cleaning step, the control unit 49 controls the first gas supply valve 80a and the second cleaning liquid supply valve 74b to be placed in an open state, while controlling the first cleaning liquid supply valve 74a and the second gas supply valve 80b to be placed in a closed state. Further, the control unit 49 controls the second drain valve 84b to be placed in a closed state, while controlling the first drain valve 84a to be placed in an open state.

Figure 13:
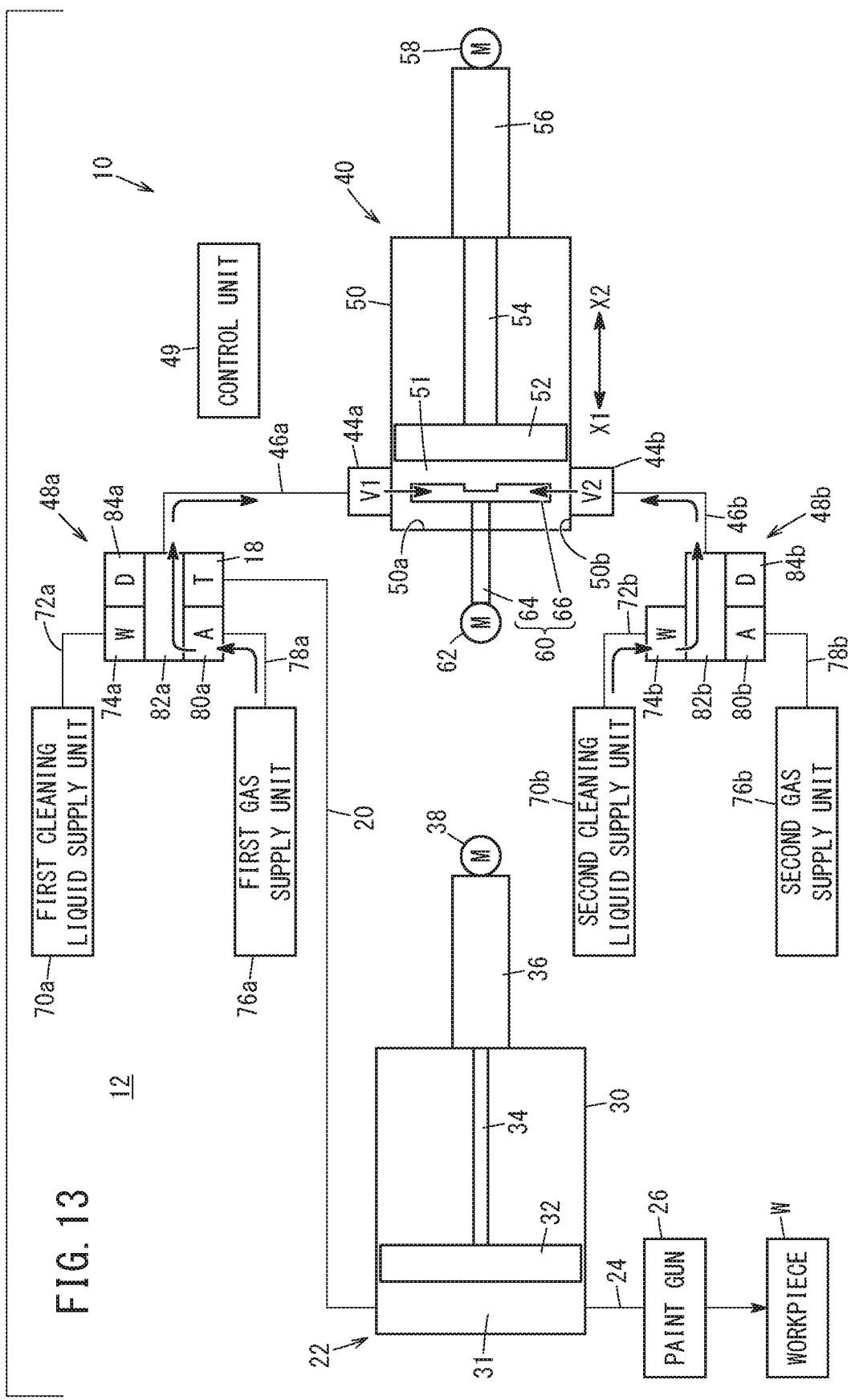
FIG. 13 is an explanatory diagram of a second cleaning step.

Upon doing so, as shown in FIG. 13, the gas in the first gas supply unit 76a is discharged toward the blade members 66 via the first gas passage 78a, the first gas supply valve 80a, the first port 82a, the first passage 46a, and the first opening/closing valve 44a. The cleaning liquid in the second cleaning liquid supply unit 70b is discharged toward the blade members 66 via the second cleaning liquid passage 72b, the second cleaning liquid supply valve 74b, the second port 82b, the second passage 46b, and the second opening/closing valve 44b. Stated otherwise, the gas is supplied from above the blade members 66, and the cleaning liquid is supplied from below the blade members 66. Consequently, paint adhering to the rotating blade members 66, and paint adhering to the inner surface of the storage chamber 51 is effectively removed. Further, in the second cleaning step, similar to the above-described first cleaning step, the cleaning liquid and the gas inside the storage chamber 51 may be intermittently discharged.

Thereafter, as shown in FIG. 5, the control unit 49 determines whether or not the number of times that the first cleaning step and the second cleaning step have been performed has reached a predetermined number (step S23). In the case that the control unit 49 has determined that the number of times that the first cleaning step and the second cleaning step have been performed has not reached the predetermined number, the first cleaning step (step S21) and the second cleaning step (step S22) are repeatedly performed.

In the case that the control unit 49 has determined that the number of times that the first cleaning step and the second cleaning step have been performed has reached the predetermined number, a blowing step is performed (step S24). In the blowing step, the control unit 49 controls the first gas supply valve 80a to be placed in an open state, while controlling the first cleaning liquid supply valve 74a, the second cleaning liquid supply valve 74b, and the second gas supply valve 80b to be placed in a closed state. Further, the control unit 49 controls the first drain valve 84a to be placed in a closed state, while controlling the second drain valve 84b to be placed in an open state. Consequently, by the gas supplied from the first gas supply unit 76a into the interior of the storage chamber 51, the cleaning liquid that adheres to the inner surface of the first passage 46a, the outer surface of the stirring member 60, the inner surface of the storage chamber 51, and the inner surface of the second passage 46b is discharged from the second drain valve 84b.

Thereafter, the control unit 49 terminates driving of the stirring drive unit 62 (step S25). Consequently, rotation of the blade members 66 is stopped. At this stage, the cleaning step is brought to an end, and together therewith, the current liquid mixing method is completed.

In this case, the liquid mixing apparatus 10 and the liquid mixing method according to the present embodiment realize the following effects.

In the liquid mixing apparatus 10 and the liquid mixing method, since the plurality of supply valves 42 are provided on the cylinder 50, the apparatus as a whole can be made compact and equipment costs can be reduced. Further, since the plurality of colored paints are drawn into the storage chamber 51 by movement of the piston 52, with a simple configuration, precise amounts of the paints can be introduced into the interior of the storage chamber 51.

The liquid mixing apparatus 10 includes the stirring member 60 which is capable of stirring the plurality of colored paints inside the storage chamber 51. The stirring member 60 includes the rotating shaft 64 that extends along the axial direction of the piston 52, and the blade members 66 that extend radially outward from the rotating shaft 64. The blade members 66 are located in the vicinity of the end surface 50a of the cylinder 50 that constitutes the storage chamber 51, and is positioned from the opposite side of the piston 52.

In this case, the volume inside the storage chamber 51 can be effectively reduced in size by placing the piston 52 in close proximity to the blade members 66. Consequently, an accurate amount of the first colored paint can be drawn into the storage chamber 51.

The plurality of supply valves 42 are disposed in the vicinity of the blade members 66. Therefore, it is possible to prevent the supply valves 42 from being covered by the piston 52 in a state in which the piston 52 is placed in close proximity to the blade members 66.

The plurality of supply valves 42 are positioned radially outward of the blade members 66 in a radial direction of the rotating shaft 64, and are spaced apart from each other in the circumferential direction. In accordance with this feature, it is possible to more reliably prevent the supply valves 42 from being covered by the piston 52 in a state in which the piston 52 is placed in close proximity to the blade members 66.

In the liquid mixing method of the present embodiment, in the introduction step, the plurality of colored paints are drawn respectively into the storage chamber 51 per each type sequentially one by one. Therefore, the plurality of colored paints can be drawn at predetermined amounts respectively into the interior of the storage chamber 51 with high accuracy.

The mixing step is not performed during the introduction step, but is performed after completion of the introduction step. Therefore, in the introduction step, the liquids can be smoothly drawn into the interior of the storage chamber 51 from each of the supply valves 42.

In the liquid mixing apparatus 10 and the liquid mixing method according to the present embodiment, since the air inside the storage chamber 51 can be discharged to the exterior by the first opening/closing valve 44*a* (air discharging unit), it is possible to prevent air (air bubbles) from being mixed into the paints when the plurality of colored paints are mixed inside the storage chamber 51. Thus, a high quality mixed paint can be obtained.

The first opening/closing valve 44*a* is disposed at a portion positioned uppermost on the inner circumferential surface 50*b* of the cylinder 50 that constitutes the storage chamber 51. In this case, when the paint is introduced into the interior of the storage chamber 51, the air inside the storage chamber 51 is discharged from the upper first opening/closing valve 44*a* as the liquid level of the paint that is stored in the lower portion of the storage chamber 51 rises. Consequently, the air inside the storage chamber 51 can be smoothly discharged to the exterior.

The cylinder 50 is disposed so that the axis thereof is positioned substantially horizontally, and the first opening/closing valve 44*a* is located in the vicinity of the end surface 50*a* of the cylinder 50 that constitutes the storage chamber 51, and is positioned from the opposite side of the piston 52. In accordance with this feature, when the first colored paint is introduced into the interior of the storage chamber 51, the first opening/closing valve 44*a* can be prevented from being covered by the piston 52, and therefore, the air inside the storage chamber 51 can be smoothly discharged to the exterior from the first opening/closing valve 44*a*.

The first opening/closing valve 44*a* is configured to switch between an open state in which the interior of the first passage 46*a* and the interior of the storage chamber 51 are in communication with each other, and a closed state in which communication between the interior of the first passage 46*a* and the interior of the storage chamber 51 is blocked. Therefore, the air inside the storage chamber 51 can be discharged to the exterior by placing the first opening/closing valve 44*a* in an open state. Further, outward leakage from the interior of the storage chamber 51 of the paint inside the storage chamber 51 can be suppressed by placing the first opening/closing valve 44*a* in a closed state.

In the liquid mixing method of the present embodiment, in the introduction step, the air discharging step is performed when the first colored paint is introduced into the interior of the storage chamber 51, whereas the air discharging step is not performed when the second or subsequent colored liquid is introduced into the interior of the storage chamber 51. Therefore, it is possible to efficiently discharge the air inside the storage chamber 51 to the exterior, while suppressing leakage of the paint inside the storage chamber 51 from the first opening/closing valve 44*a* when the second or subsequent colored paints are introduced.

In the air discharging step, after the piston 52 is moved in a direction in which the volume inside the storage chamber 51 increases and the first colored liquid has been introduced into the interior of the storage chamber 51, the piston 52 is made to move in a direction in which the volume inside the storage chamber 51 is reduced, so that the first colored paint inside the storage chamber 51 is introduced into the first opening/closing valve 44*a*. Therefore, the air inside the storage chamber 51 can be reliably discharged to the exterior.

In the liquid mixing apparatus 10 and the liquid mixing method according to the present embodiment, a transfer pump for supplying the paints into the interior of the storage chamber 51 by drawing the paints into the interior of the storage chamber 51 due to movement of the piston 52 is rendered unnecessary, and therefore, the apparatus as a whole can be made compact. Further, the plurality of colored paints are drawn into the interior of the storage chamber 51 per each color sequentially one by one, in a state in which the pressure inside the storage chamber 51 is made lower than the pressures inside the respective tanks 28. Therefore, accurate amounts of the paints can be introduced into the interior of the storage chamber 51.

The control unit 49 reduces the pressure inside the storage chamber 51 by controlling the supply valves 42 and the piston 52 in a manner so that the piston 52 moves in a direction in which the volume inside the storage chamber 51 increases in a state in which all of the supply valves 42 are closed. In accordance with this feature, with a simple configuration, it is possible to reduce the pressure inside the storage chamber 51.

The control unit 49 controls the supply valves 42 and the piston 52 in a manner so that the piston 52 moves in a direction in which the volume inside the storage chamber 51 increases in a state in which all of the supply valves 42 are closed, from a time at which a previous introduction of paint into the interior of the storage chamber 51 is ended and until introduction of a current paint into the interior of the storage chamber 51 is started. Therefore, more accurate amounts of the liquids can be introduced into the interior of the storage chamber 51.

In the liquid mixing apparatus 10 according to the present embodiment and the cleaning method therefor, the cleaning liquid and the gas supplied into the interior of the storage chamber 51 from the first opening/closing valve 44*a* (first cleaning valve) and the second opening/closing valve 44*b* (second cleaning valve) can be subjected to stirring by the stirring member 60. Further, since the axis of the cylinder 50 extends substantially horizontally, the paint inside the storage chamber 51 can be discharged to the exterior from the second opening/closing valve 44*b* together with the cleaning liquid. Thus, the stirring member 60 and the interior of the storage chamber 51 can be cleaned efficiently.

The stirring member 60, the first opening/closing valve 44a, and the second opening/closing valve 44b are positioned on a common plane. In accordance with this feature, the cleaning liquid and the gas can be efficiently supplied to the stirring member 60 from directions above and below the stirring member 60. Thus, the stirring member 60 and the interior of the storage chamber 51 can be cleaned efficiently.

The first opening/closing valve 44a is positioned above the blade members 66, and the second opening/closing valve 44b is positioned below the blade members 66. In accordance with this feature, the blade members 66 can be cleaned effectively.

In the liquid mixing apparatus 10, since the cleaning liquid and the gas can be supplied from the first cleaning liquid supply unit 70a and the first gas supply unit 76a into the interior of the storage chamber 51 via the first passage 46a and the first opening/closing valve 44a, it is possible to clean the first passage 46a and the first opening/closing valve 44a through which the gas flows.

In the cleaning method for the liquid mixing apparatus 10 of the present embodiment, in the cleaning step, the first cleaning step and the second cleaning step are carried out. In the first cleaning step, the cleaning liquid is supplied toward the stirring member 60 from the first opening/closing valve 44a, together with the gas being supplied toward the stirring member 60 from the second opening/closing valve 44b. In the second cleaning step, the gas is supplied toward the stirring member 60 from the first opening/closing valve 44a, together with the cleaning liquid being supplied toward the stirring member 60 from the second opening/closing valve 44b. Consequently, the stirring member 60 and the interior of the storage chamber 51 can be effectively cleaned by the cleaning liquid and the gas.

In the cleaning step, the first cleaning step and the second cleaning step are repeatedly performed alternately a plurality of times. Therefore, the stirring member 60 and the interior of the storage chamber 51 can be cleaned more efficiently.

The present invention is not necessarily limited to the configuration and method described above.

Figure 14A:
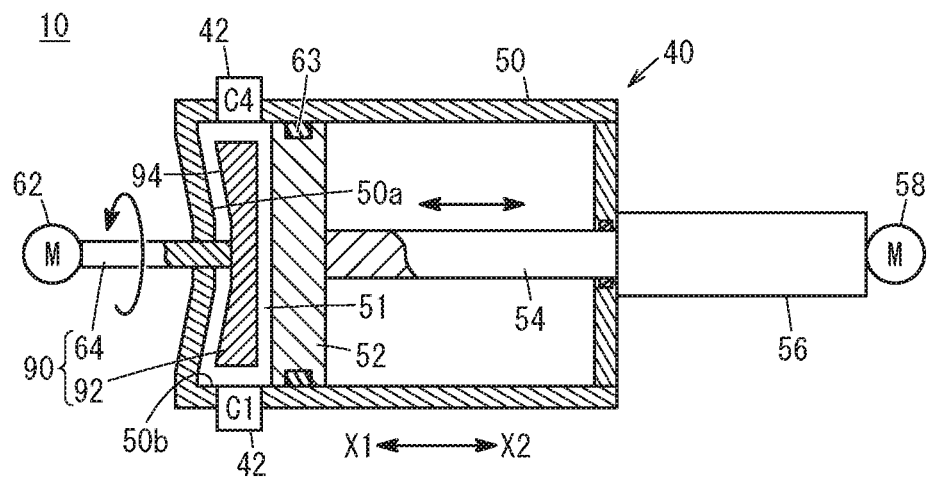
FIG. 14A is a longitudinal cross-sectional view with partial omission of a liquid mixing apparatus including a stirring member according to a first modification.

The liquid mixing apparatus 10 may have a stirring member 90 as shown in FIG. 14A. As shown in FIG. 14A, the stirring member 90 includes the blade members 92. On each of such blade members 92, inclined surfaces 94, which are inclined radially outward in the direction of the arrow X1, are formed on surfaces (surfaces on a side opposite from the piston 52) on a side (in the direction of the arrow X1) on which the rotating shaft 64 is located. Further, the end surface 50a of the cylinder 50 that constitutes the storage chamber 51 extends along the inclined surfaces 94 of the blade members 92. In accordance with such a configuration, the paints that are introduced into the interior of the storage chamber 51 can be stirred efficiently.

Figure 14B:
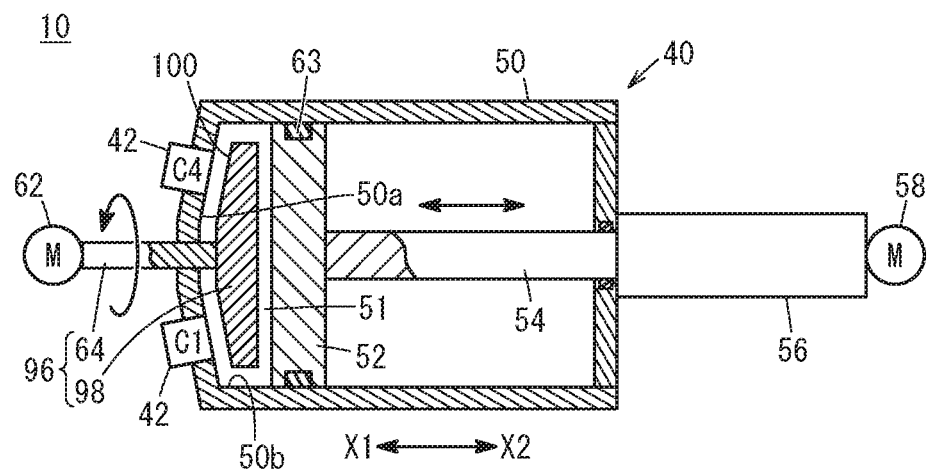
FIG. 14B is a longitudinal cross-sectional view with partial omission of a liquid mixing apparatus including a stirring member according to a second modification.

The liquid mixing apparatus 10 may have a stirring member 96 as shown in FIG. 14B. As shown in FIG. 14B, the stirring member 96 includes the blade members 98. On the blade members 98, inclined surfaces 100, which are inclined radially outward in the direction of the arrow X2, are formed on surfaces (surfaces on a side opposite from the piston 52) on a side (in the direction of the arrow X1) on which the rotating shaft 64 is located. Further, the end surface 50a of the cylinder 50 that constitutes the storage chamber 51 extends along the inclined surfaces 100 of the blade members 98. In addition, the respective supply valves 42 are disposed on the end surface 50a of the cylinder 50, in a manner so that the paints are discharged onto the inclined surfaces 100 of the blade members 98. In accordance with such a configuration, the paints that are introduced into the interior of the storage chamber 51 can be stirred efficiently.

Figure 15A:
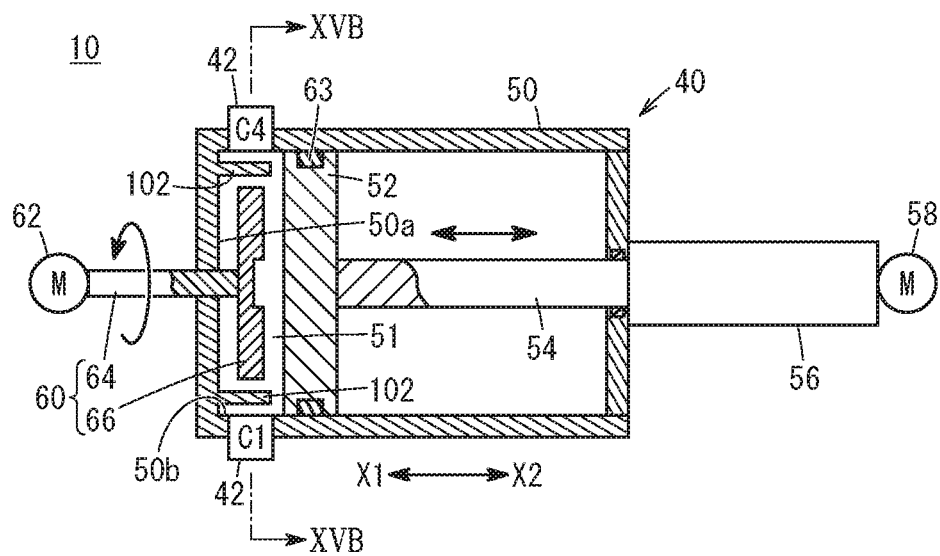
FIG. 15A is a longitudinal cross-sectional view with partial omission of a liquid mixing apparatus in which wall portions are provided between each of respective supply valves and a stirring member.
Figure 15B:
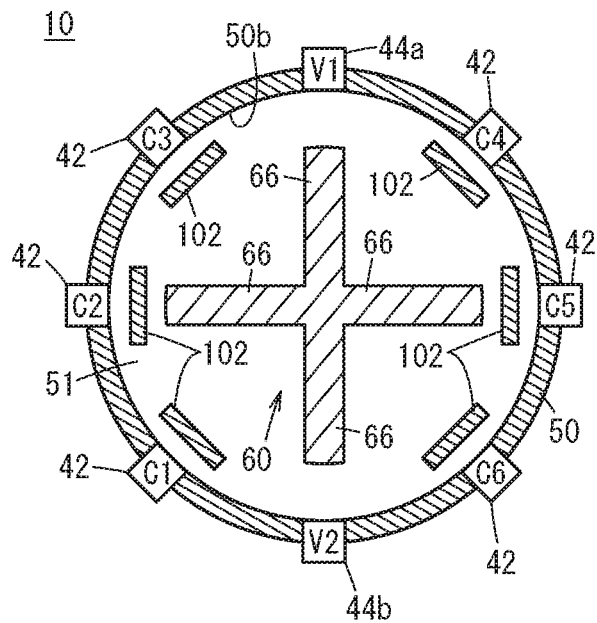
FIG. 15B is a lateral cross-sectional view taken along line XVB-XVB of FIG. 15A.

As shown in FIGS. 15A and 15B, within the interior of the storage chamber 51 of the liquid mixing apparatus 10, wall portions 102 may be provided between the stirring member 60 and the respective supply valves 42. Each of the wall portions 102 extends from the end surface 50a of the cylinder 50 that constitutes the storage chamber 51, in a manner so as to cover the stirring member 60. In accordance with such a configuration, since the wall portions 102 are disposed between the stirring member 60 and each of the supply valves 42, it is possible to prevent the paints that are led out from the supply valves 42 from hitting against the stirring member 60 and generating air bubbles.

Figure 16:
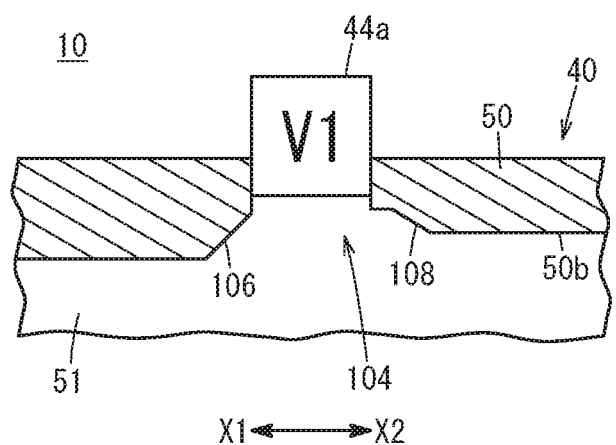
FIG. 16 is a cross-sectional view with partial omission of the liquid mixing apparatus for describing a guide recess thereof.

As shown in FIG. 16, a guide recess 104 for guiding the paint to the first opening/closing valve 44a may be formed on the inner circumferential surface 50b of the cylinder 50 that constitutes the storage chamber 51. A first guide surface 106 positioned more in the direction of the arrow X1 than the first opening/closing valve 44a, and a second guide surface 108 positioned more in the direction of the arrow X2 than the first opening/closing valve 44a are provided on the wall surface constituting the guide recess 104. The first guide surface 106 is inclined radially outward of the cylinder 50 in the direction of the arrow X2. The second guide surface 108 is inclined radially outward of the cylinder 50 in the direction of the arrow X1.

In accordance with such a configuration, in the introduction step, since the air inside the cylinder 50 can be smoothly guided to the first opening/closing valve 44a, mixing of air into the paints can be further suppressed. Further, in the transfer step, the mixed paint inside the storage chamber 51 can be smoothly guided to the first opening/closing valve 44a.

Figure 17:
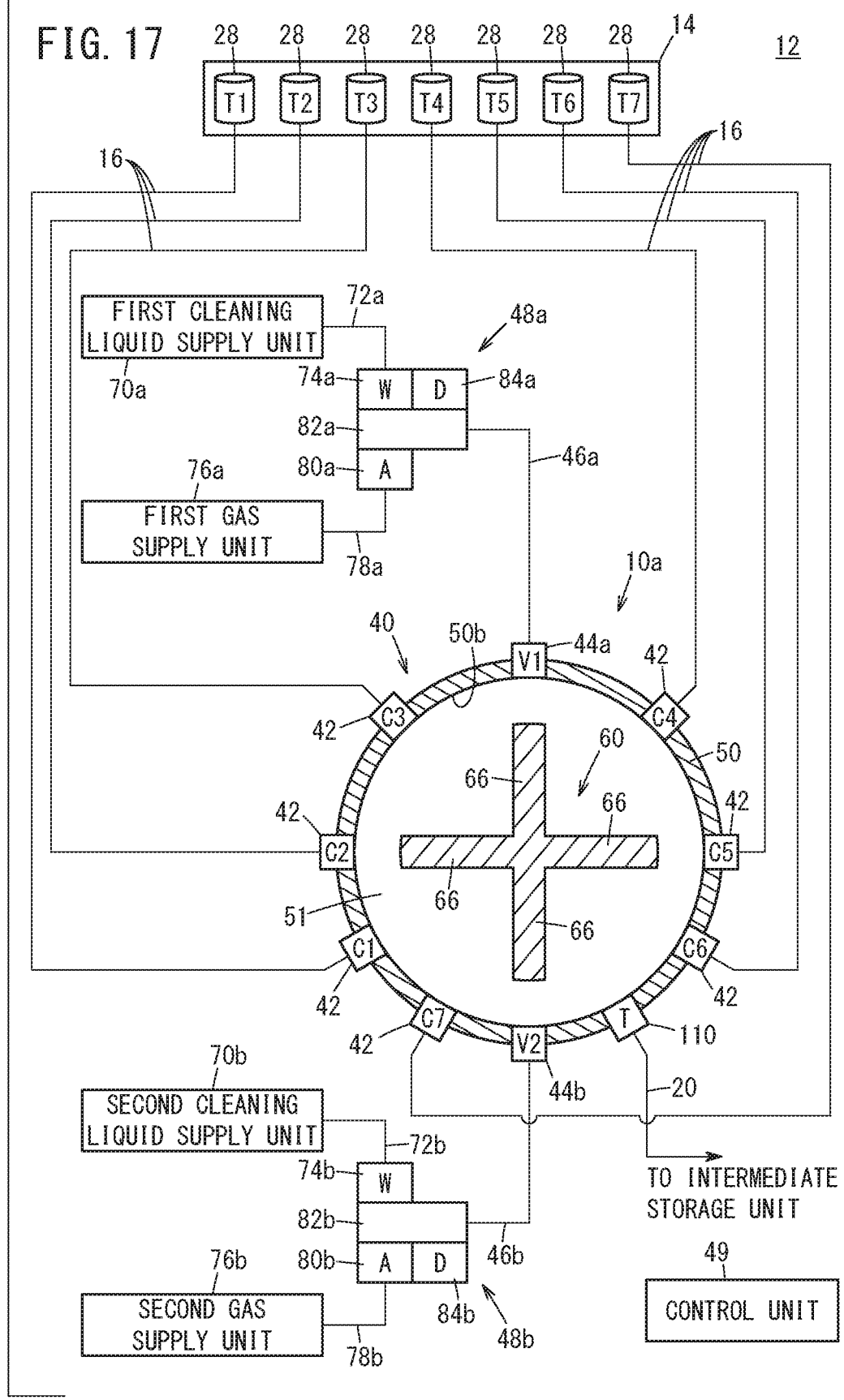
FIG. 17 is a schematic diagram showing a cross-sectional view of a liquid mixing apparatus for describing an example in which a trigger valve is provided in a cylinder.

As shown in FIG. 17, the painting system 12 may comprise a liquid mixing apparatus 10a. A trigger valve 110 is provided on the cylinder 50 of the liquid mixing apparatus 10a. Moreover, in FIG. 17, an example is shown in which seven of the supply valves 42 are provided; however, the number of supply valves 42 can be set arbitrarily.

The trigger valve 110 is disposed adjacent to the second opening/closing valve 44b. More specifically, the trigger valve 110 is disposed more downwardly than the stirring member 60. Based on a signal from the control unit 49, the trigger valve 110 is configured to switch between an open state in which the interior of the storage chamber 51 and the interior of the transfer passage 20 are in communication with each other, and a closed state in which communication between the interior of the storage chamber 51 and the interior of the transfer passage 20 is blocked. In this case, the above-described trigger valve 18 shown in FIG. 1 is omitted. Even with such a configuration, the mixed paint inside the storage chamber 51 can be smoothly transferred into the intermediate storage chamber 31.

Further, the pressure adjusting unit may include a preliminary chamber which is capable of communicating with the interior of the storage chamber 51 via an opening/closing valve. In accordance with such a configuration, during the pressure adjusting step, by opening the opening/closing valve and thereby placing the storage chamber 51 and the preliminary chamber in communication with each other, the volume inside the storage chamber 51 can be substantially enlarged without causing the piston 52 to move. Thus, the pressure inside the storage chamber 51 can be made lower than the pressure inside the respective tanks 28.

In the introduction step, after the air discharging step (step S13) has been completed, the control unit 49 may drive the stirring drive unit 62 and initiate rotation of the stirring member 60. In accordance with this feature, even in a situation in which the viscosity of the paints is comparatively high, the plurality of colored paints can be mixed efficiently.

The mixing step may be initiated during the introduction step. In this case, since the plurality of colored paints are subjected to stirring while being drawn into the interior of the storage chamber 51, the time from initiation of the introduction step until completion of the mixing step can be made shorter.

The cylinder 50 is not limited to an example of being disposed so that the axis thereof extends substantially horizontally. The cylinder 50 may be disposed in any manner, and for example, may be arranged in a manner so that the axis thereof extends substantially vertically.

Figure 18:
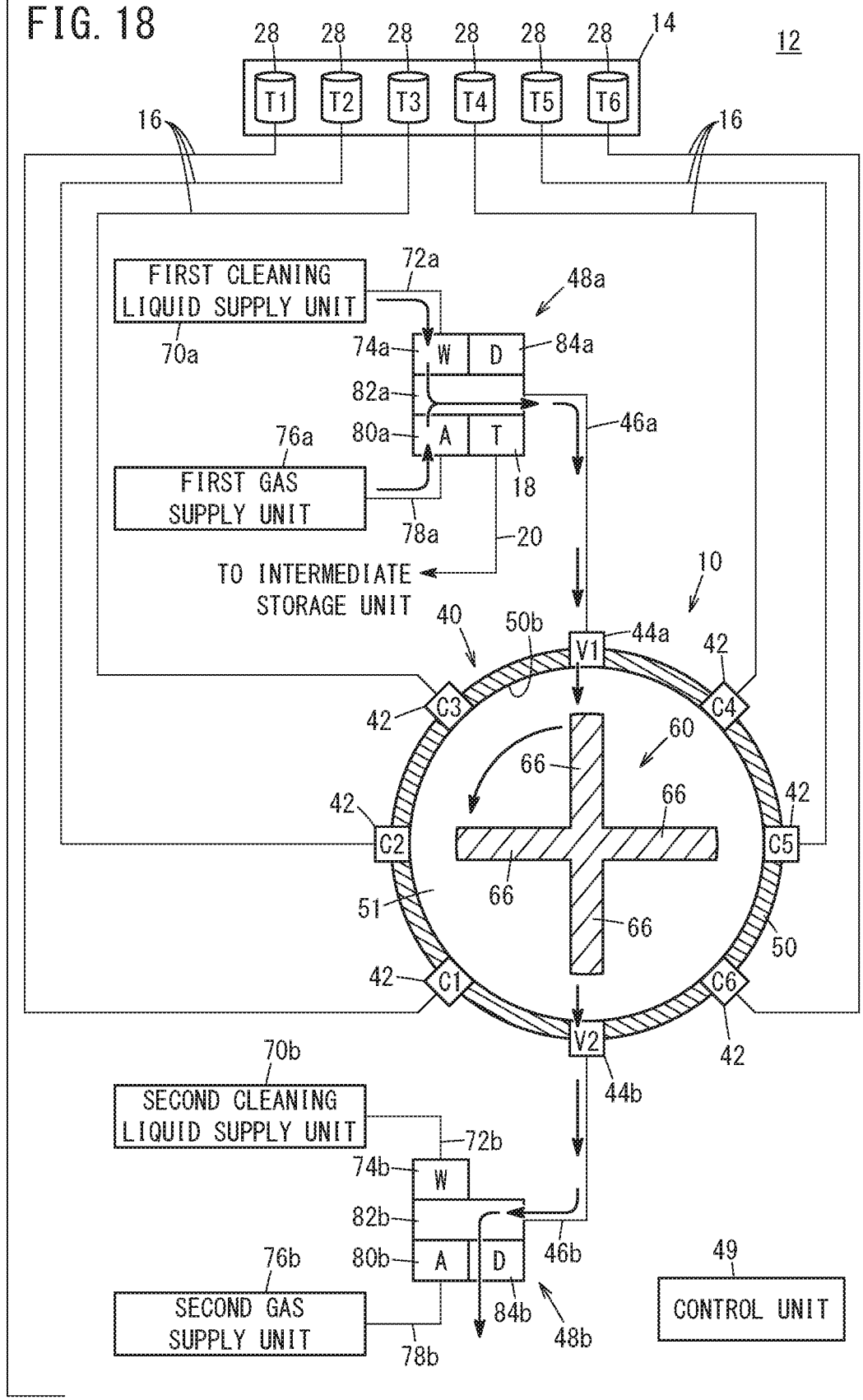
FIG. 18 is an explanatory diagram of the first cleaning step according to a modification.

The first cleaning step (step S21) and the second cleaning step (step S22) are not limited to the methods described above, and for example, may be exemplified by the first cleaning step shown in FIG. 18 and the second cleaning step shown in FIGS. 19 to 22.

More specifically, as shown in FIG. 18, in the first cleaning step, the control unit 49 controls all of the supply valves 42 to be placed in a closed state, while controlling the first opening/closing valve 44a and the second opening/closing valve 44b to be placed in an open state. Further, the control unit 49 controls the first cleaning liquid supply valve 74a and the first gas supply valve 80a to be placed in an open state, while controlling the second cleaning liquid supply valve 74b and the second gas supply valve 80b to be placed in a closed state. Furthermore, the control unit 49 controls the first drain valve 84a to be placed in a closed state, while controlling the second drain valve 84b to be placed in an open state.

Upon doing so, the cleaning liquid in the first cleaning liquid supply unit 70a and the gas in the first gas supply unit 76a are discharged toward the blade members 66 via the first port 82a, the first passage 46a, and the first opening/closing valve 44a. Consequently, the first passage 46a and the first opening/closing valve 44a are cleaned effectively.

By the rotating action of the blade members 66, the cleaning liquid that is introduced from the first opening/closing valve 44a into the interior of the storage chamber 51 is spread substantially uniformly throughout the entirety of the storage chamber 51. Consequently, the paint inside the storage chamber 51 is diluted. At this time, by the rotation of the blade members 66, a shearing force is imparted to the cleaning liquid. Therefore, the viscosity of the cleaning liquid in which the paint is contained decreases. In addition, the gas and the cleaning liquid inside the storage chamber 51 are smoothly discharged to the exterior via the second opening/closing valve 44b, the second passage 46b, and the second drain valve 84b.

Figure 19:
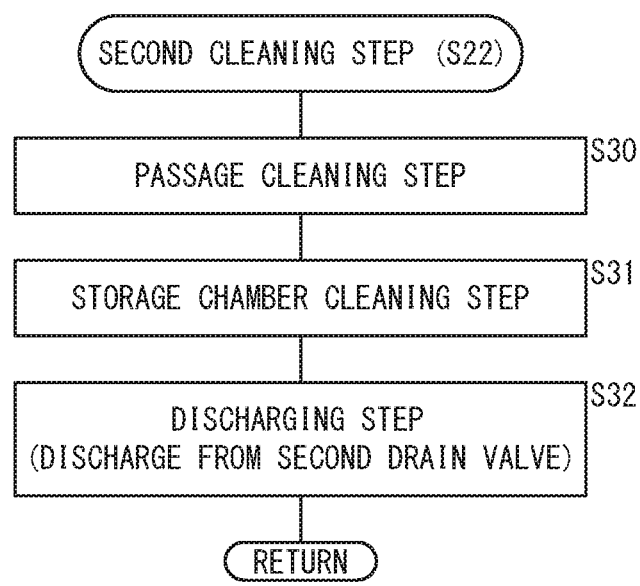
FIG. 19 is a flowchart showing a second cleaning step according to a modification.
Figure 20:
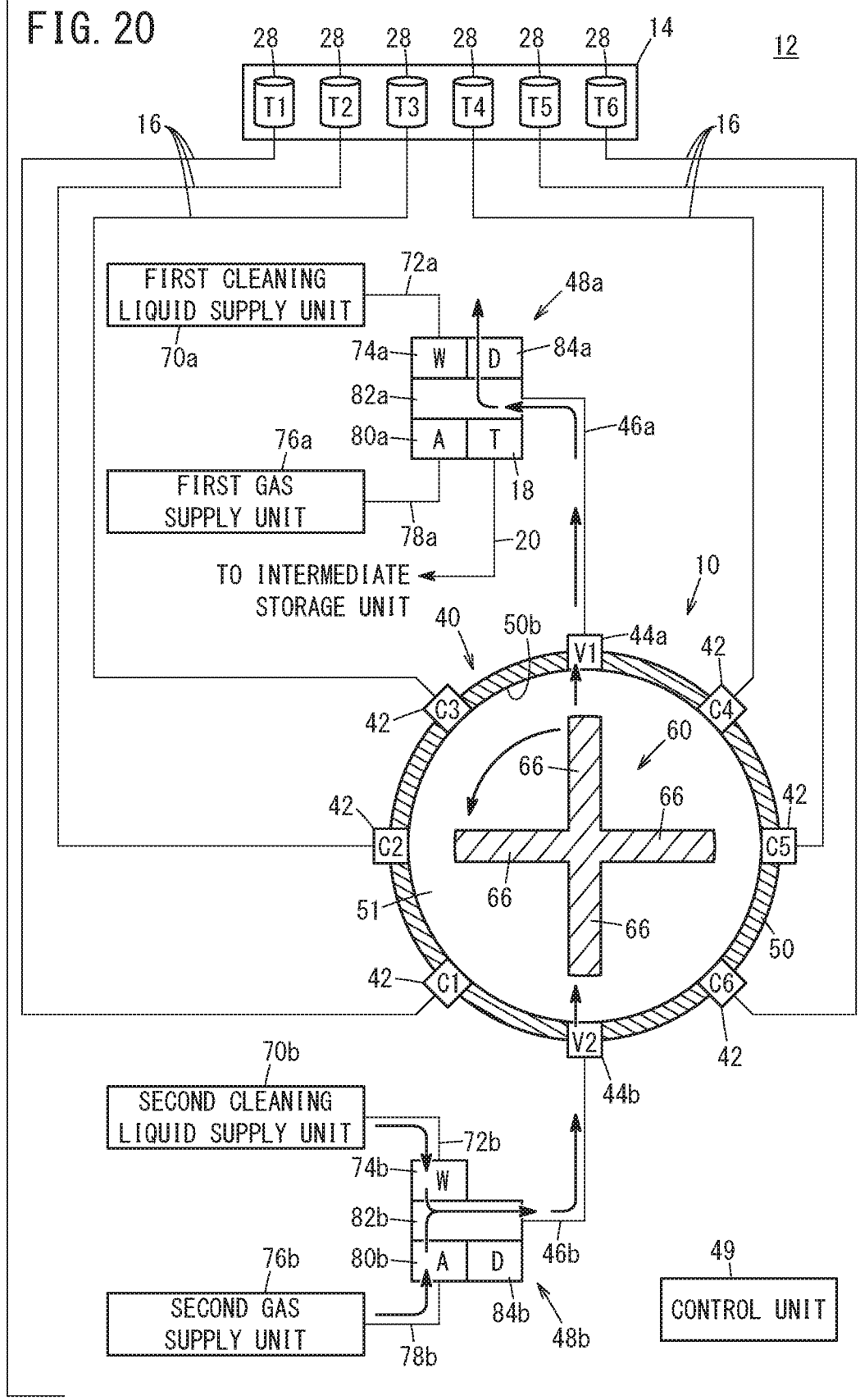
FIG. 20 is an explanatory diagram of a passage cleaning step.

Further, in the second cleaning step, as shown in FIG. 19, a passage cleaning step (step S30), a storage chamber cleaning step (step S31), and a discharging step (step S32) are sequentially performed. As shown in FIG. 20, in the passage cleaning step, the control unit 49 controls the first cleaning liquid supply valve 74a and the first gas supply valve 80a to be placed in a closed state, while controlling the second cleaning liquid supply valve 74b and the second gas supply valve 80b to be placed in an open state. Further, the second drain valve 84b is controlled to be placed in a closed state, and the first drain valve 84a is controlled to be placed in an open state. Moreover, the first opening/closing valve 44a and the second opening/closing valve 44b are placed in an open state.

Upon doing so, the cleaning liquid in the second cleaning liquid supply unit 70b, and the gas in the second gas supply unit 76b are discharged into the interior of the storage chamber 51 via the second port 82b, the second passage 46b, and the second opening/closing valve 44b. Consequently, the second passage 46b is cleaned effectively. In accordance with this feature, during the first cleaning step, even in the case that the second passage 46b becomes contaminated by the cleaning liquid in which the paint is contained, the second passage 46b can be cleaned by the passage cleaning step.

By the rotating action of the blade members 66, the cleaning liquid that is introduced from the second opening/closing valve 44b into the interior of the storage chamber 51 is spread substantially uniformly throughout the entirety of the storage chamber 51. Consequently, the paint inside the storage chamber 51 is diluted. At this time, by the rotation of the blade members 66, a shearing force is imparted to the cleaning liquid. Therefore, the viscosity of the cleaning liquid in which the paint is contained decreases. Further, the cleaning liquid and the gas inside the storage chamber 51 are discharged to the exterior via the first opening/closing valve 44a, the first passage 46a, and the first drain valve 84a.

Figure 21:
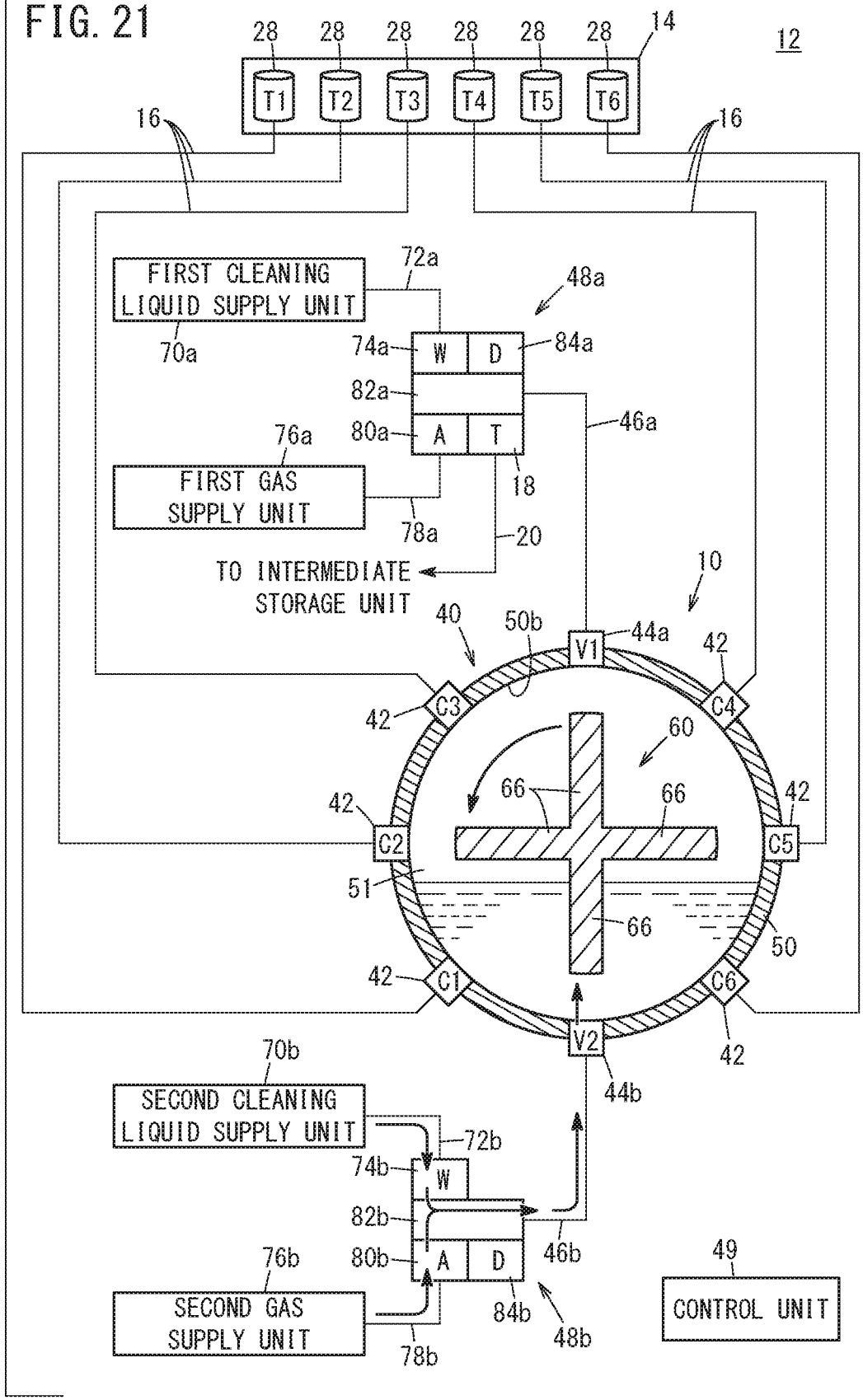
FIG. 21 is an explanatory diagram of a storage chamber cleaning step.

As shown in FIG. 21, in the storage chamber cleaning step, the control unit 49 controls the first opening/closing valve 44a to be placed in a closed state while the open state of the second opening/closing valve 44b is maintained as is. Upon doing so, the cleaning liquid in the second cleaning liquid supply unit 70b, and the gas in the second gas supply unit 76b are discharged into the interior of the storage chamber 51 via the second passage 46b and the second opening/closing valve 44b.

The cleaning liquid introduced from the second opening/closing valve 44b into the interior of the storage chamber 51 is stored inside the storage chamber 51. The stored amount of cleaning liquid inside the storage chamber 51 is set to be less than or equal to half the volume of the storage chamber 51. The cleaning liquid that is stored in the storage chamber 51 is spread substantially uniformly throughout the entirety of the storage chamber 51 by the rotating action of the blade members 66. In accordance with this feature, the interior of the storage chamber 51 (the inner surface of the storage chamber 51, the rotating shaft 64, and the blade members 66) is cleaned effectively.

Figure 22:
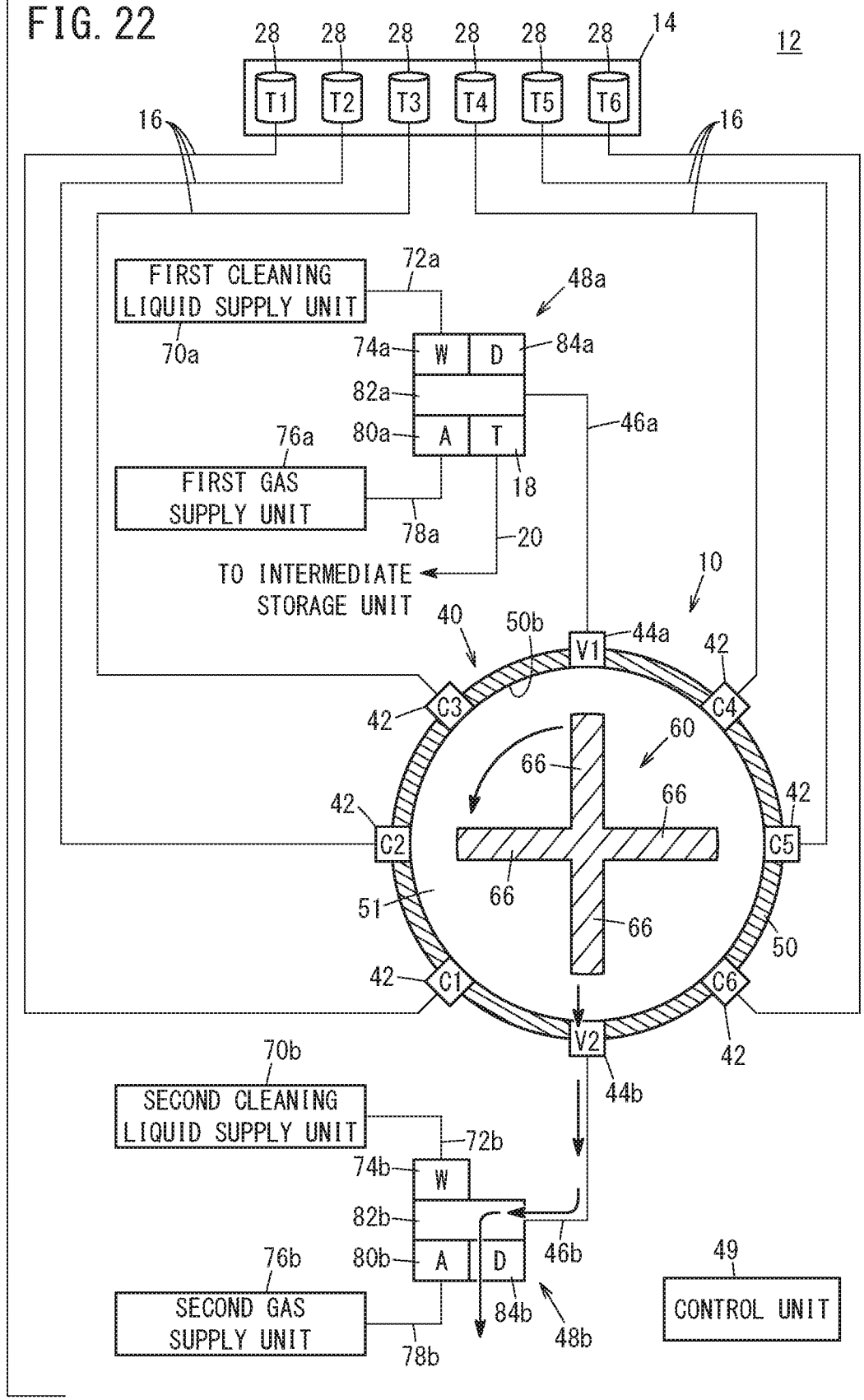
FIG. 22 is an explanatory diagram of a discharging step.

As shown in FIG. 22, in the discharging step, the second cleaning liquid supply valve 74b and the second gas supply valve 80b are controlled to be placed in a closed state, together with the second opening/closing valve 44b and the second drain valve 84b being controlled to be placed in an open state. Consequently, the cleaning liquid and the gas inside the storage chamber 51 are discharged to the exterior via the second opening/closing valve 44b, the second passage 46b, and the second drain valve 84b. Even with such a first cleaning step and a second cleaning step, the same advantages and effects as those of the above-described cleaning step can be realized.

Figure 23:
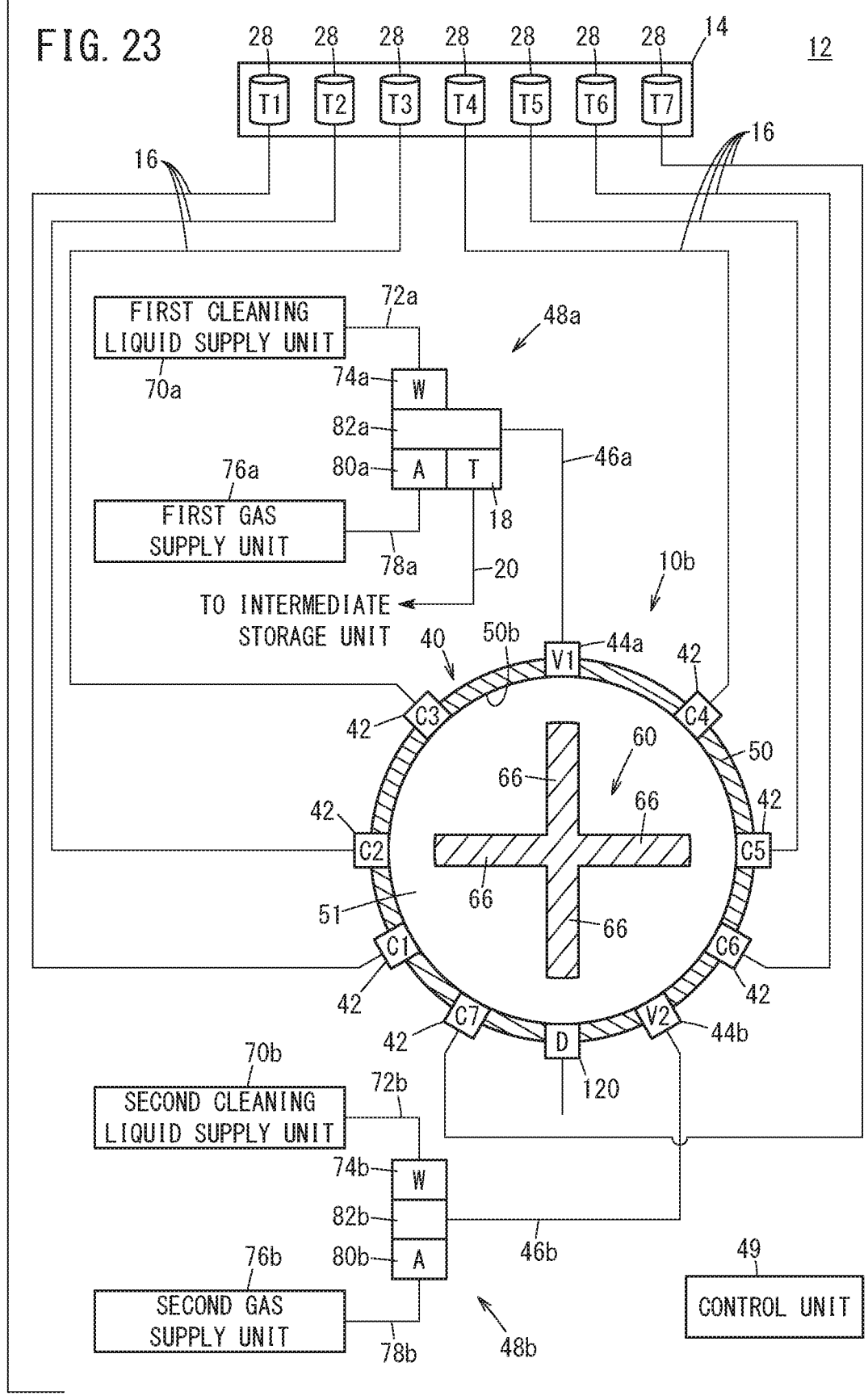
FIG. 23 is a schematic diagram showing a cross-sectional view of the liquid mixing apparatus according to a modification.

As shown in FIG. 23, the painting system 12 may comprise a liquid mixing apparatus 10b. In the liquid mixing apparatus 10b, a drain valve 120 is provided at the lowermost position of the cylinder 50. In this case, the second opening/closing valve 44b is disposed adjacent to the drain valve 120. Further, in the liquid mixing apparatus 10b, the aforementioned first drain valve 84a and the second drain valve 84b are omitted. Moreover, in FIG. 23, an example is shown in which seven of the supply valves 42 are provided; however, the number of supply valves 42 can be set arbitrarily.

Figure 24:
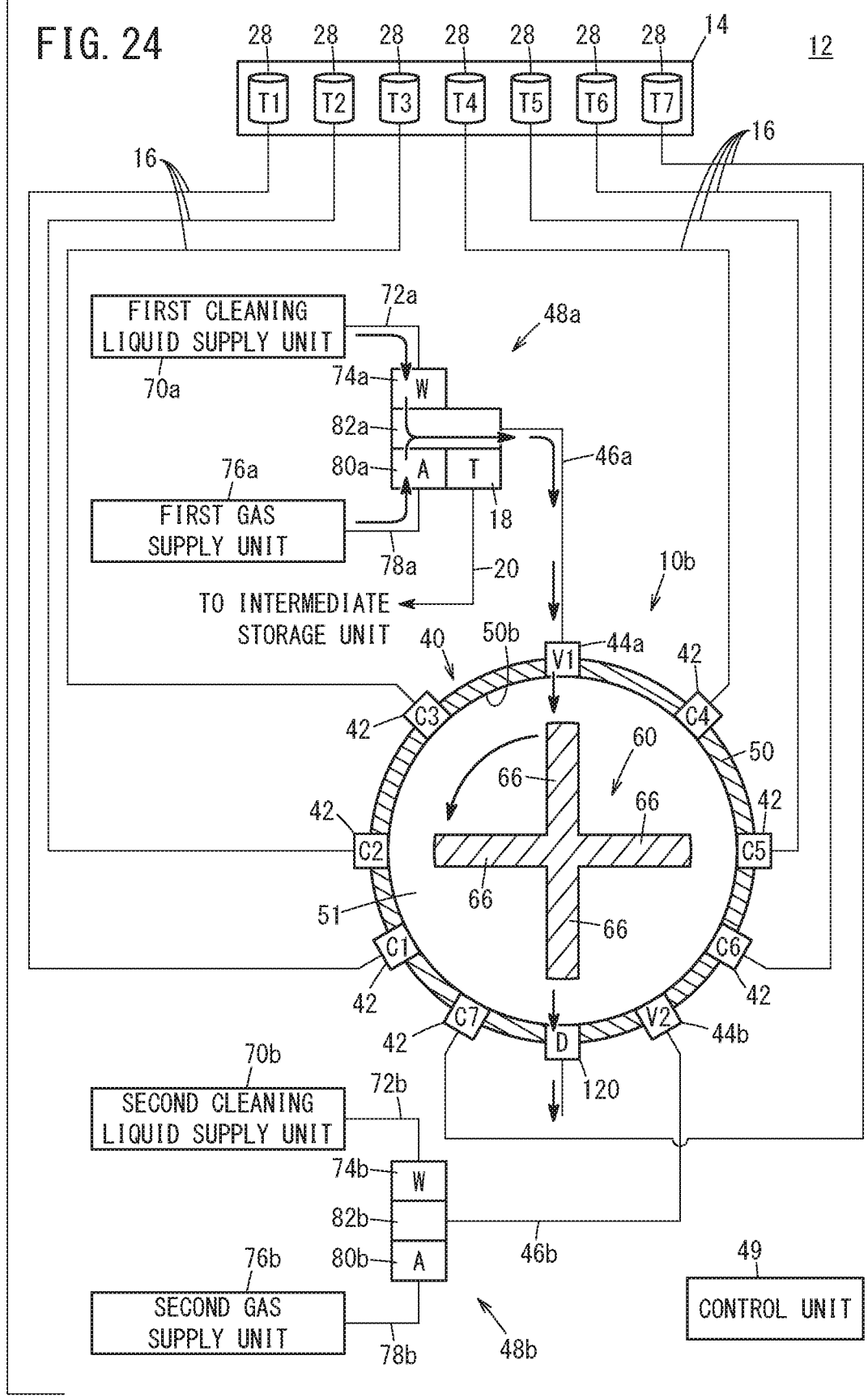
FIG. 24 is an explanatory diagram of a first cleaning step of the liquid mixing apparatus shown in FIG. 23.
Figure 25:
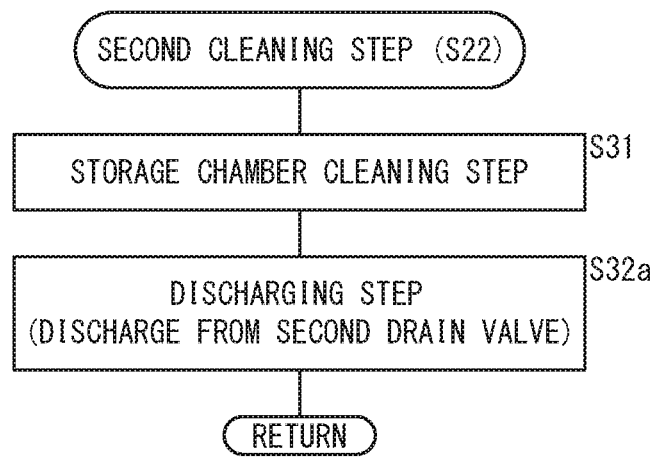
FIG. 25 is a flowchart showing a second cleaning step of the liquid mixing apparatus shown in FIG. 23.
Figure 26:
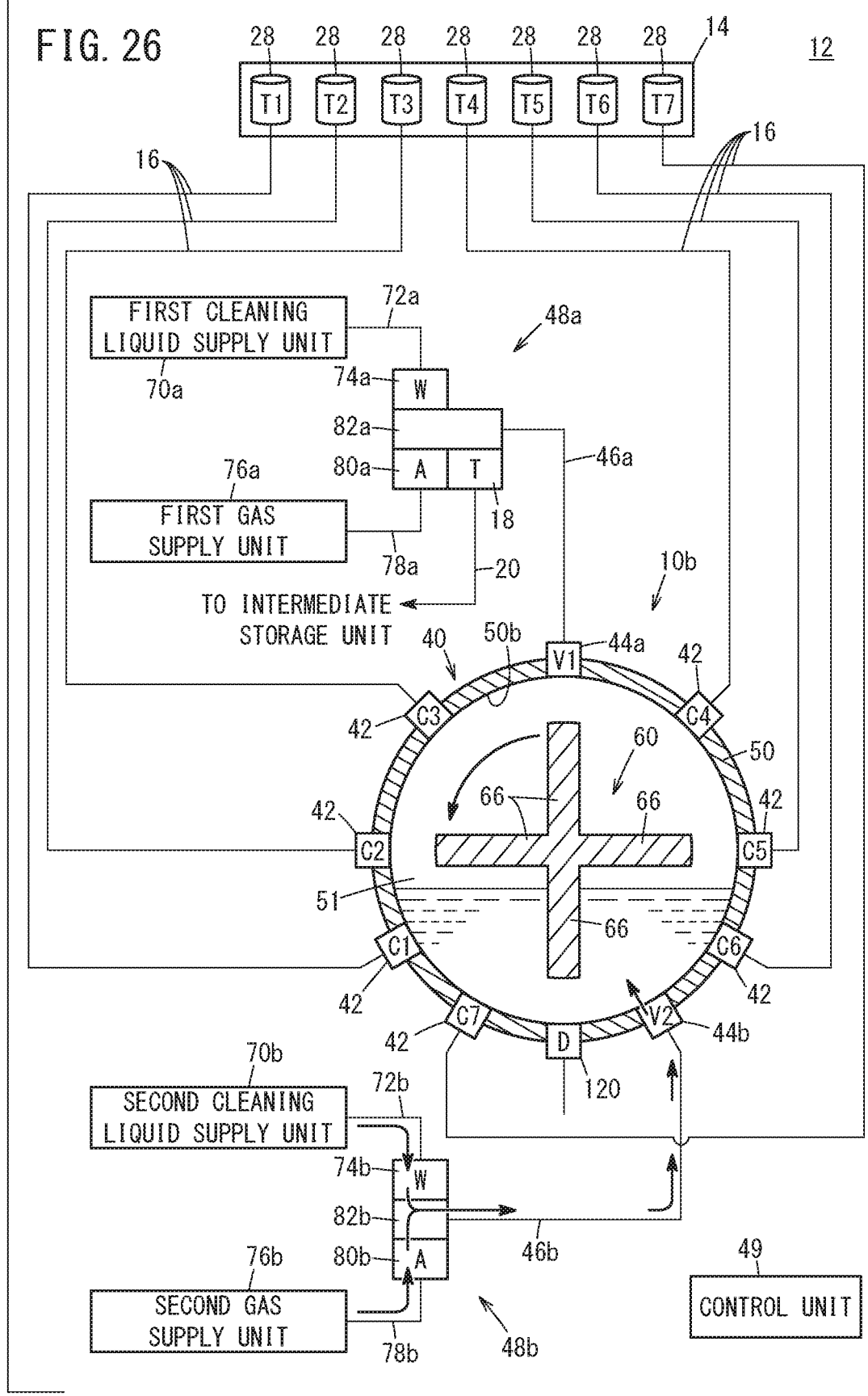
FIG. 26 is an explanatory diagram of a storage chamber cleaning step of the liquid mixing apparatus shown in FIG. 23.
Figure 27:
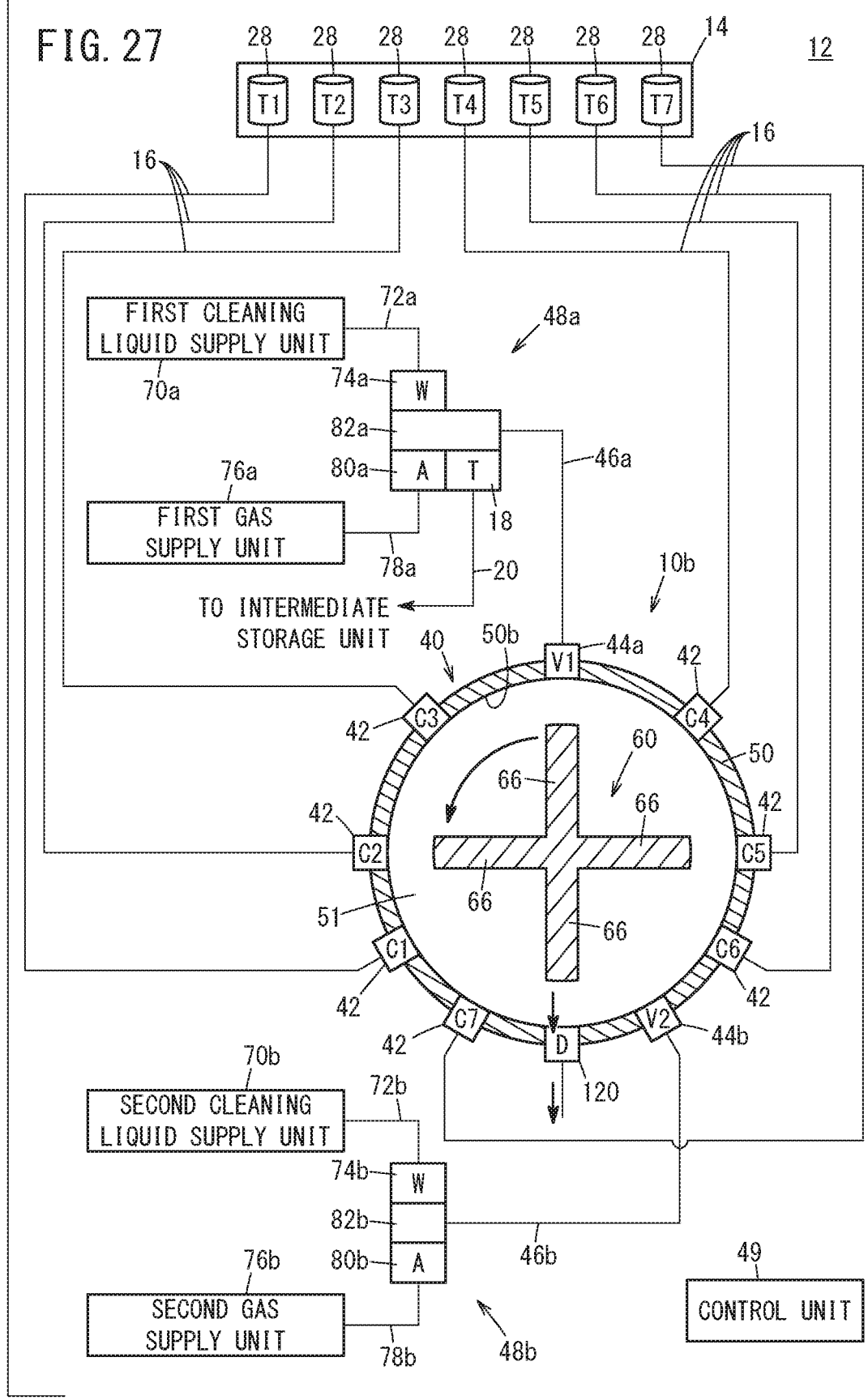
FIG. 27 is an explanatory diagram of a discharging step of the liquid mixing apparatus shown in FIG. 23.

In the liquid mixing apparatus 10b equipped with the configuration shown in FIG. 23, the first cleaning step shown in FIG. 24, and the second cleaning step shown in FIGS. 25 to 27 are performed.

More specifically, as shown in FIG. 24, in the first cleaning step, the gas and the cleaning liquid inside the storage chamber 51 are more smoothly discharged to the exterior via the drain valve 120, as compared with the above-described first cleaning step shown in FIG. 18.

Further, in the second cleaning step, as shown in FIG. 25, a storage chamber cleaning step (step S31) and a discharging step (step S32*a*) are sequentially performed. In the storage chamber cleaning step, as shown in FIG. 26, the control unit 49 controls the first opening/closing valve 44*a* and the drain valve 120 to be placed in a closed state, while controlling the second cleaning liquid supply valve 74*b*, the second gas supply valve 80*b*, and the second opening/closing valve 44*b* to be placed in an open state. Consequently, the cleaning liquid in the second cleaning liquid supply unit 70*b* and the gas in the second gas supply unit 76*b* are discharged into the interior of the storage chamber 51.

In the discharging step, the control unit 49 controls the second opening/closing valve 44*b* to be placed in a closed state, while controlling the drain valve 120 to be placed in an open state. Consequently, as shown in FIG. 27, the cleaning liquid and the gas inside the storage chamber 51 are discharged to the exterior via the drain valve 120. Even with such a first cleaning step and a second cleaning step, the same advantages and effects as those of the above-described cleaning step can be realized.

Further, in this case, in the discharging step, since the cleaning liquid introduced into the storage chamber 51 does not pass through the first passage 46*a* and the second passage 46*b*, it is possible to prevent the first passage 46*a* and the second passage 46*b* from becoming contaminated by the cleaning liquid in which the paint is contained. Accordingly, the cleaning operation can be performed efficiently.

In the above-described liquid mixing apparatuses 10, 10*a*, and 10*b*, in the pressure adjusting step, the control unit 49 reduces the pressure inside the storage chamber 51. However, the liquid mixing apparatuses 10, 10*a*, and 10*b* may be provided with a pressure adjusting unit which is separate from the control unit 49. In this case, the pressure adjusting unit may be configured to be capable of cooling the interior of the storage chamber 51, in a manner so that the pressure inside the storage chamber 51 becomes lower than the pressures in each of the tanks 28.

In the painting system 12, the intermediate storage unit 22 may be omitted, and the paints of the liquid mixing apparatuses 10, 10*a*, and 10*b* may be directly supplied to the paint gun 26 via the trigger valve 18. The liquid mixing apparatuses 10*a* and 10*b* may be equipped with the above-described stirring members 90 and 96 instead of the stirring member 60.

The liquid mixing apparatus and the liquid mixing method according to the present invention are not limited to the above-described embodiments, and it goes without saying that various configurations could be adopted therein without deviating from the essence and gist of the present invention.

What is claim is:

1. A liquid mixing apparatus configured to mix a plurality of types of liquids, the liquid mixing apparatus comprising:
   a cylinder;
   a piston slidably disposed in an interior of the cylinder so as to form, inside the cylinder, a storage chamber in which the plurality of types of liquids are capable of being stored;
   a stirring member disposed inside the storage chamber and which is capable of stirring the plurality of types of liquids inside the storage chamber; and
   a plurality of supply valves provided on an inner surface of the cylinder constituting the storage chamber and which are capable of individually supplying the plurality of types of liquids into the storage chamber;
   wherein
   the plurality of supply valves are configured to switch between an open state and a closed state, the open state being a state in which an interior of the storage chamber and an interior of a supply passage that guides the plurality of types of liquids to the storage chamber are in communication with each other, and the closed state being a state in which communication between the interior of the storage chamber and the interior of the supply passage is blocked, and
   the liquids are drawn into an interior of the storage chamber from the supply valves that are in the open state, by the piston undergoing movement in a direction in which a volume inside the storage chamber increases.

2. The liquid mixing apparatus according to claim 1, the stirring member further comprising:
   a rotating shaft extending along an axial direction of the piston; and
   blade members extending radially outward from the rotating shaft;
   wherein the blade members are located in a vicinity of an end surface of the cylinder that constitutes the storage chamber, and is positioned from an opposite side of the piston.

3. The liquid mixing apparatus according to claim 2, wherein the plurality of supply valves are disposed in a vicinity of the blade members.

4. The liquid mixing apparatus according to claim 3, wherein the plurality of supply valves are positioned radially outward of the blade members in a radial direction of the rotating shaft, and are spaced apart from each other in a circumferential direction.

5. The liquid mixing apparatus according to claim 3, wherein the plurality of supply valves are disposed on the end surface of the cylinder.

6. The liquid mixing apparatus according to claim 2, wherein an axis of the rotating shaft is positioned on an axis of the piston.

7. A liquid mixing method for mixing a plurality of types of liquids, the liquid mixing method comprising:
   an introduction step of individually introducing the plurality of types of liquids into an interior of a storage chamber of a cylinder from a plurality of supply valves provided on the cylinder; and
   a mixing step of stirring the plurality of types of liquids introduced into the interior of the storage chamber by a stirring member disposed inside the storage chamber;
   wherein
   the plurality of supply valves are provided on an inner surface of the cylinder constituting the storage chamber and configured to switch between an open state and a closed state, the open state being a state in which an interior of the storage chamber and an interior of a supply passage that guides the plurality of types of liquids to the storage chamber are in communication with each other, and the closed state being a state in which communication between the interior of the storage chamber and the interior of the supply passage is blocked, and in the introduction step, the liquids are drawn into the interior of the storage chamber from the supply valves that are in the open state, by a piston undergoing movement in a direction in which a volume inside the storage chamber increases.

8. The liquid mixing method according to claim 7, wherein in the introduction step, the plurality of types of liquids are drawn respectively into the storage chamber per each type sequentially one by one.

9. The liquid mixing method according to claim 7, wherein the mixing step is not performed during the introduction step, but is performed after completion of the introduction step.

10. The liquid mixing method according to claim 7, wherein the mixing step is initiated during the introduction step.

* * * * *